(12) United States Patent
Huang et al.

(10) Patent No.: US 11,109,318 B2
(45) Date of Patent: Aug. 31, 2021

(54) METHODS AND SYSTEMS FOR REUSE OF A WIRELESS MEDIUM DURING WAKE-UP OF A WIRELESS DEVICE

(71) Applicant: Intel Corporation, Santa Clara, CA (US)

(72) Inventors: Po-Kai Huang, San Jose, CA (US); Minyoung Park, San Ramon, CA (US); Thomas J. Kenney, Portland, OR (US); Shahrnaz Azizi, Cupertino, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/570,905

(22) Filed: Sep. 13, 2019

(65) Prior Publication Data

US 2020/0015167 A1     Jan. 9, 2020

Related U.S. Application Data

(63) Continuation of application No. 15/719,029, filed on Sep. 28, 2017, now Pat. No. 10,462,744.

(Continued)

(51) Int. Cl.
*H04W 52/02* (2009.01)
*H04W 74/08* (2009.01)
(Continued)

(52) U.S. Cl.
CPC ....... *H04W 52/0235* (2013.01); *H04B 1/0028* (2013.01); *H04B 1/40* (2013.01);
(Continued)

(58) Field of Classification Search
CPC ......... H04W 52/0219; H04W 52/0229; H04W 52/0235; H04W 74/085; H04W 74/0808; H04B 1/0028; H04B 1/40
See application file for complete search history.

(56) References Cited

U.S. PATENT DOCUMENTS 6,212,396 B1    4/2001 Brown et al.
2005/0074007 A1  4/2005 Samuels et al.
(Continued)

FOREIGN PATENT DOCUMENTS

CN    108430099 A    8/2018

OTHER PUBLICATIONS

U.S. Appl. No. 15/719,029, filed Sep. 28, 2017, Methods and Systems for Reuse of a Wireless Medium During Wake-Up of a Wireless Device.

(Continued)

*Primary Examiner* — Melanie Jagannathan
(74) *Attorney, Agent, or Firm* — Schwegman Lundberg & Woessner, P.A.

(57) ABSTRACT

Methods, devices, and systems for retransmission of wake-up signals from a first station to a second station over a wireless network are disclosed. In some aspects, a wake-up signal is encoded for transmission to the second station. While the first station is waiting for an acknowledgment of the wake-up signal from the second station, the second station may retransmit the wake up signal and/or encode a packet for transmission to a third station. In some aspects, whether the wake-up signal is retransmitted is based in part, on at least one of whether a number of timeout events for wake-up signals transmitted to the second station exceeds a maximum timeouts threshold, whether a number of wake-up signals transmitted to the second station exceeds a maximum wake-up signals threshold; or whether a maximum predetermined elapsed time since a first wake-up signal was transmitted to the second station is exceeded.

20 Claims, 15 Drawing Sheets

Related U.S. Application Data

(60) Provisional application No. 62/458,739, filed on Feb. 14, 2017, provisional application No. 62/473,162, filed on Mar. 17, 2017.

(51) Int. Cl.
*H04B 1/40* (2015.01)
*H04W 84/12* (2009.01)
*H04B 1/00* (2006.01)

(52) U.S. Cl.
CPC ........ *H04W 74/0808* (2013.01); *H04W 84/12* (2013.01); *Y02D 30/70* (2020.08)

(56) References Cited

U.S. PATENT DOCUMENTS

| | | |
|---|---|---|
| 2005/0243058 A1 | 11/2005 | Morris et al. |
| 2011/0074552 A1 | 3/2011 | Norair et al. |
| 2011/0140851 A1* | 6/2011 | Lee .................. H04W 52/0235 340/9.1 |
| 2011/0176465 A1 | 7/2011 | Panta et al. |
| 2012/0093245 A1 | 4/2012 | Makdissi et al. |
| 2013/0114606 A1 | 5/2013 | Schrum, Jr. et al. |
| 2014/0056197 A1 | 2/2014 | Deng |
| 2015/0006936 A1 | 1/2015 | Yasui |
| 2015/0139083 A1 | 5/2015 | Kneckt et al. |
| 2015/0350115 A1 | 12/2015 | Bergman |
| 2016/0337223 A1 | 11/2016 | Mackay |
| 2017/0003736 A1 | 1/2017 | Turon |
| 2017/0280498 A1 | 9/2017 | Min et al. |
| 2017/0295588 A1 | 10/2017 | Ahn et al. |
| 2018/0020404 A1 | 1/2018 | Huang et al. |
| 2018/0063788 A1* | 3/2018 | Yang .................... H04W 12/108 |
| 2018/0092117 A1 | 3/2018 | Azizi et al. |
| 2018/0234921 A1 | 8/2018 | Huang et al. |
| 2018/0249413 A1 | 8/2018 | Sun et al. |
| 2019/0159127 A1* | 5/2019 | Son .................. H04W 52/0219 |
| 2019/0191376 A1* | 6/2019 | Kim .................. H04W 52/0229 |

OTHER PUBLICATIONS

"U.S. Appl. No. 15/719,029, Non Final Office Action dated Dec. 13, 2018", 11 pgs.

"U.S. Appl. No. 15/719,029, Notice of Allowance dated Jun. 13, 2019", 9 pgs.

"U.S. Appl. No. 15/719,029, Response filed Mar. 13, 2019 to Non Final Office Action dated Dec. 13, 2018", 10 pgs.

* cited by examiner

METHODS AND SYSTEMS FOR REUSE OF A WIRELESS MEDIUM DURING WAKE-UP OF A WIRELESS DEVICE

CROSS REFERENCE TO RELATED APPLICATIONS

This application is a continuation of U.S. patent application Ser. No. 15/719,029, filed Sep. 28, 2017, which claims priority to U.S. Provisional Patent Application No. 62/458,739, filed Feb. 14, 2017 and entitled "ACKNOWLEDGEMENT FOR SUCCESSIVE WAKE-UP PACKET TRANSMISSION," and to U.S. Provisional Patent Application No. 62/473,162, filed Mar. 17, 2017, and entitled "MODIFIED SYMBOL BLOCK STRUCTURE FOR SPACE TIME BLOCK CODING." The disclosures of these prior applications are considered part of this application, and are hereby incorporated by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for acknowledgement for successive wake-up packet transmission.

BACKGROUND

Efficient use of the resources of a wireless local-area network (WLAN) is important to provide bandwidth and acceptable response times to the users of the WLAN. In some environments, many devices may share the same resources. Additionally, some devices may be limited by their communication protocol or by their hardware bandwidth. Moreover, wireless devices may need to operate with both newer protocols and with legacy device protocols. Thus, improved methods and systems for utilizing the available capacity of a wireless network are desired.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
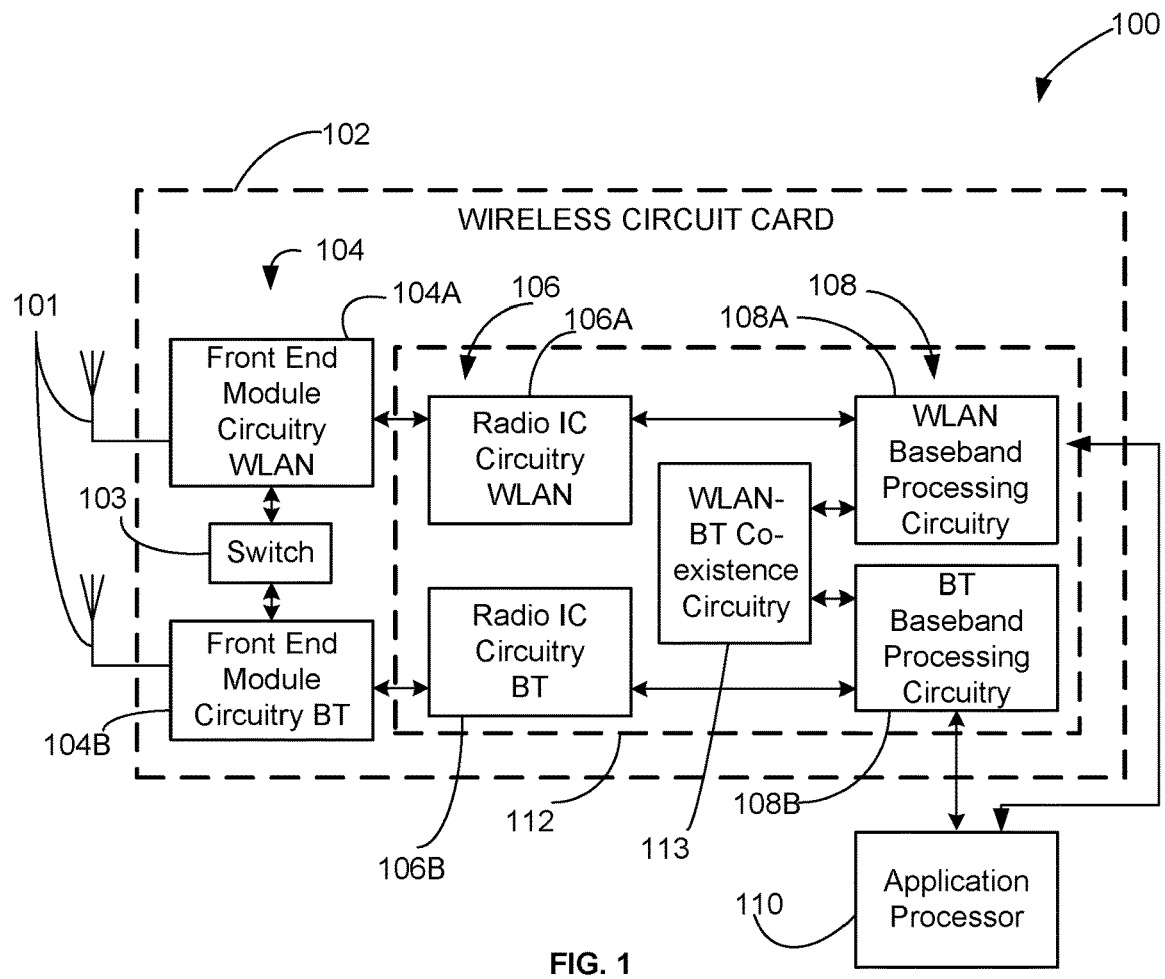
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
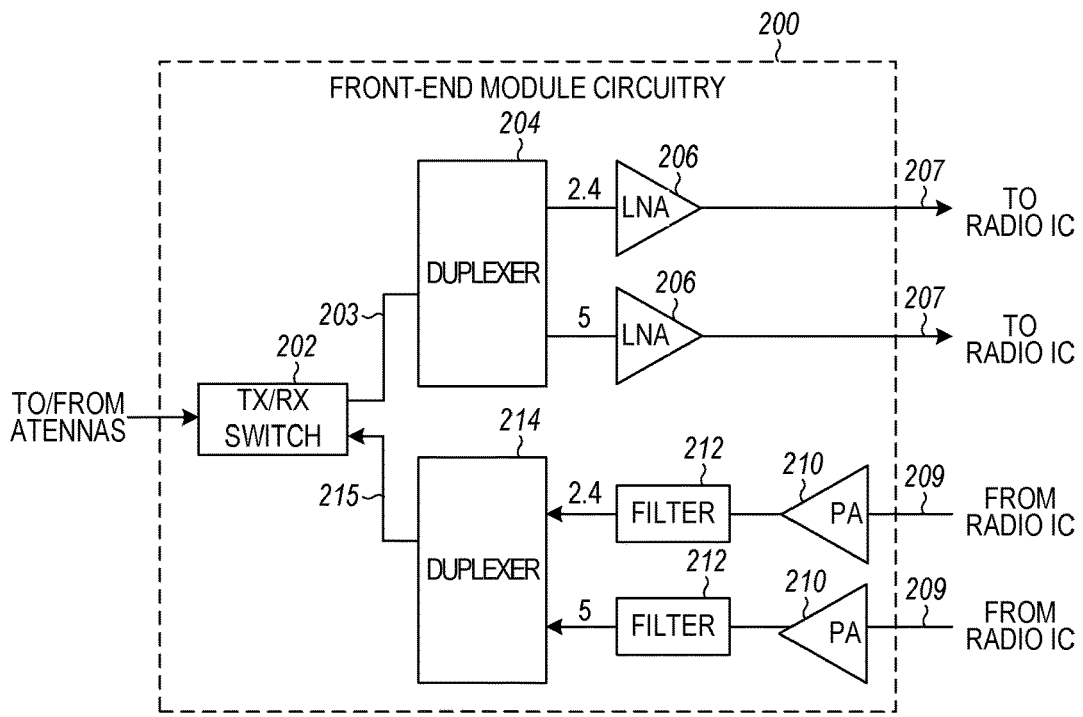
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
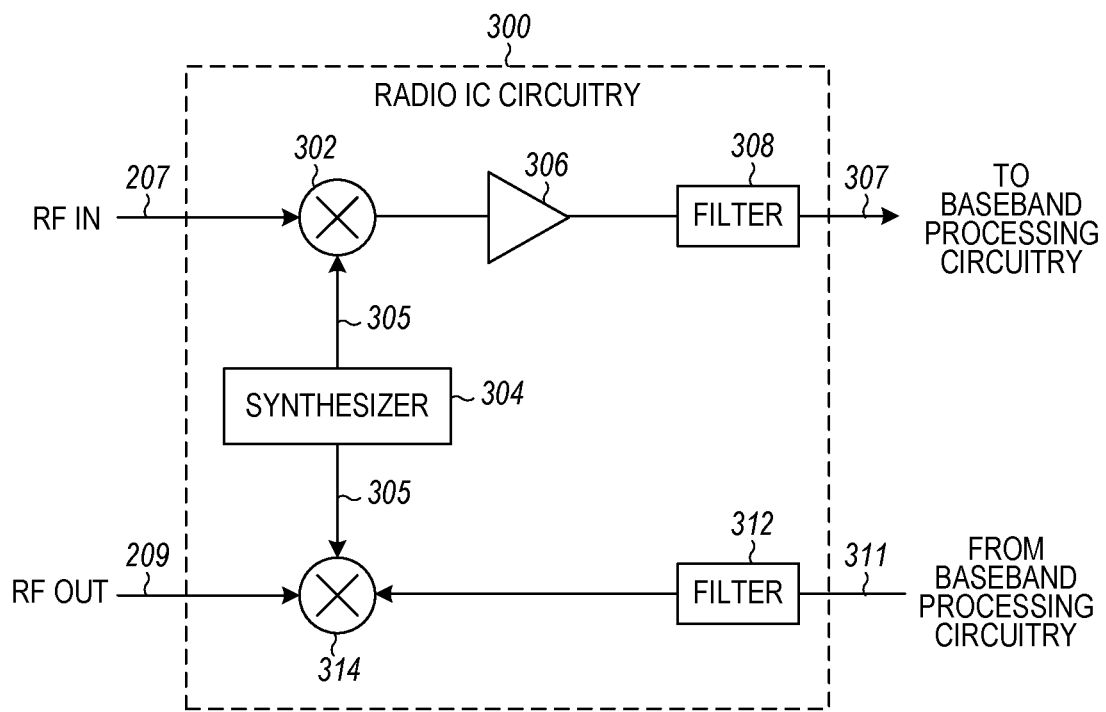
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
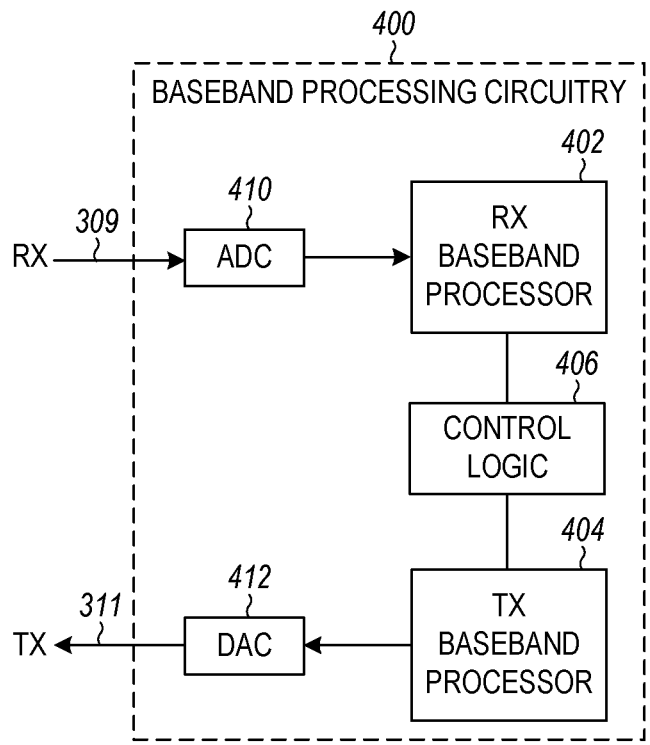
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 of FIG. 1 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
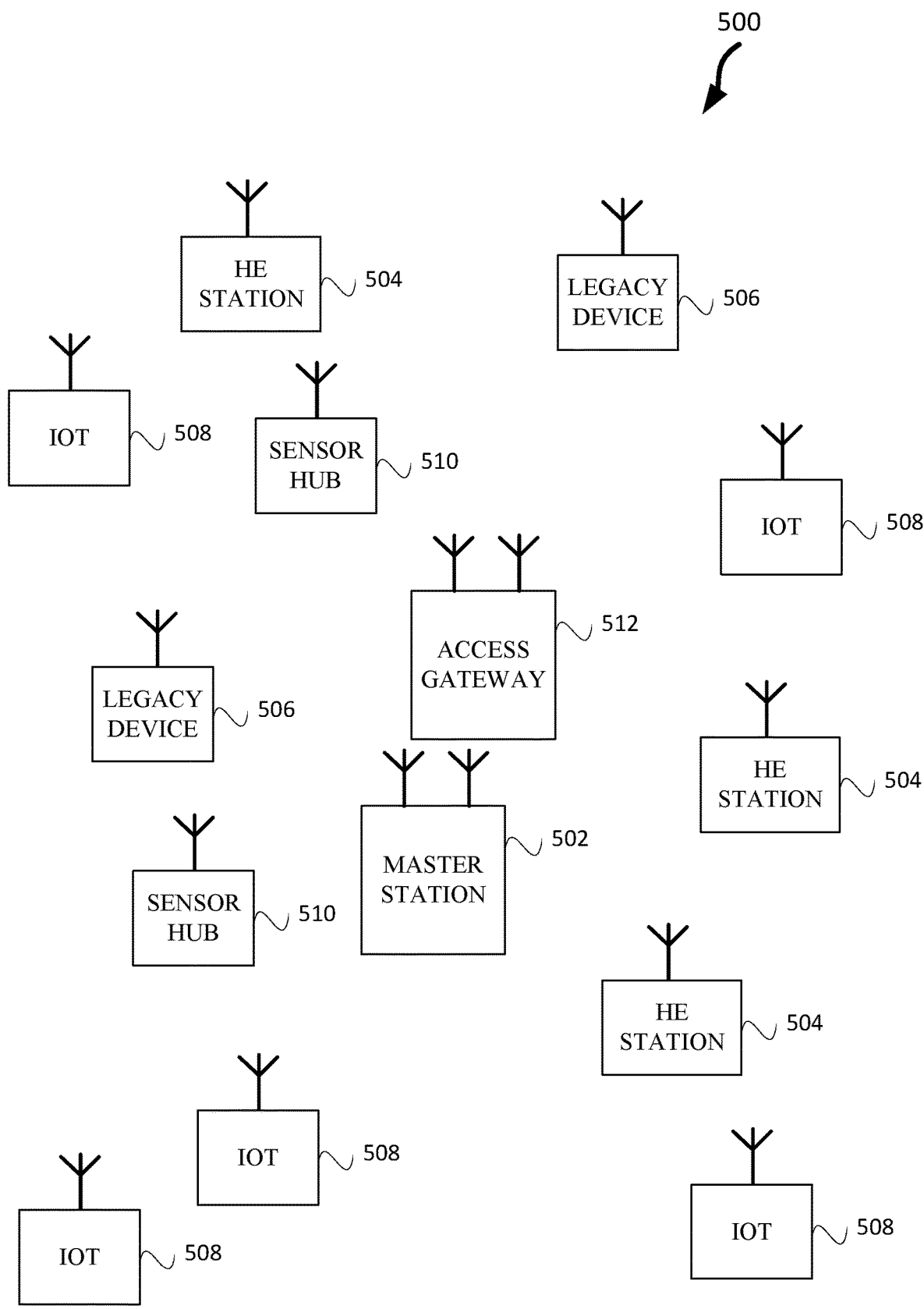
FIG. 5 illustrates a wireless network in accordance with some embodiments.

FIG. 5 illustrates a WLAN 100 in accordance with some embodiments. The WLAN may comprise a basic service set (BSS) 500 that may include one or more master stations 502, which may be APs, one or more high efficiency (HE) wireless stations (HE stations) (e.g., IEEE 802.11ax) HE stations 504, a plurality of legacy (e.g., IEEE 802.11n/ac) devices 506, a plurality of IoT devices 508 (e.g., IEEE 802.11ax), and one or more sensor hubs 510. Any of the devices 502, 504, 506, 508, and/or 510 illustrated in FIG. 5 may include the radio architecture 100 illustrated in FIG. 1. Additionally, one or more of the devices 502, 504, 506, 508, and/or 510 may also include the application processor 110. In some aspects, the application processor 110 may be configured by instructions stored in an electronic memory to perform one or more of the functions discussed herein.

The master station 502 may be an AP using the IEEE 802.11 to transmit and receive. The master station 502 may be a base station. The master station 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 502 may be a virtual master station 502 shares hardware resources with another wireless device such as another master station 502.

The legacy devices 506 may operate in accordance with one or more of IEEE 802.11 a/b/g/n/ac/ad/af/ah/aj, or another legacy wireless communication standard. The legacy devices 506 may be STAs or IEEE STAs. The HE stations 504 may be wireless transmit and receive devices such as cellular telephone, smart telephone, handheld wireless device, wireless glasses, wireless watch, wireless personal device, tablet, a portable wireless device, or another device that may be transmitting and receiving using the IEEE 802.11 protocol such as IEEE 802.11ax or another wireless protocol. In some embodiments, the HE stations 504 may be termed high efficiency wireless local-area network (HE) stations.

The master station 502 may communicate with legacy devices 506 in accordance with legacy IEEE 802.11 communication techniques. In example embodiments, the master station 502 may also be configured to communicate with HE stations 504 in accordance with legacy IEEE 802.11 communication techniques.

The IoT devices 508 may operate in accordance with IEEE 802.11ax or another standard of 802.11. The IoT devices 508 may be, in some embodiments, narrow band devices that operate on a smaller sub-channel than the HE stations 504. For example, the IoT devices 508 may operate on 2.03 MHz or 4.06 MHz sub-channels. In some embodiments, the IoT devices 508 are not able to transmit on a full 20 MHz sub-channel to the master station 502 with sufficient power for the master station 502 to receive the transmission. In some embodiments, the IoT devices 508 are not able to receive on a 20 MHz sub-channel and use a small sub-channel such as 2.03 MHz or 4.06 MHz sub-channel. In some embodiments, the IoT devices 508 may operate on a sub-channel with exactly 26 or 52 data sub-carriers. The IoT devices 508, in some embodiments, may be short-range, low-power devices.

The IoT devices 508 may be battery constrained. The IoT devices 508 may be sensors designed to measure one or more specific parameters of interest such as temperature sensor, pressure sensor, humidity sensor, light sensor, etc. The IoT devices 508 may be location-specific sensors. Some IoT devices 508 may be connected to a sensor hub 510. The IoT devices 508 may upload measured data from sensors to the sensor hub 510. The sensor hubs 510 may upload the data to an access gateway 512 that connects several sensor hubs 510 and can connect to a cloud sever or the Internet (not illustrated). The master station 502 may act as the access gateway 512 in accordance with some embodiments. The master station 502 may act as the sensor hub 510 in accordance with some embodiments. The IoT device 508 may have identifiers that identify a type of data that is measured from the sensors. In some embodiments, the IoT device 508 may be able to determine a location of the IoT device 508 based on received satellite signals or received terrestrial wireless signals.

In some embodiments, at least some of the IoT devices 508 need to consume very low average power in order to perform a packet exchange with the sensor hub 510 and/or access gateway 512. The IoT devices 508 may be densely deployed.

The IoT devices 508 may enter a power save mode and may exit the power save at intervals to gather data from sensors and/or to upload the data to the sensor hub 510 or access gateway 512.

In some embodiments, the master station 502 HE stations 504, legacy stations 506, IoT devices 508, access gateways 512, Bluetooth™ devices, and/or sensor hubs 510 enter a power save mode and exit the power save mode periodically or at a pre-scheduled times to see if there is a packet for them to be received. In some embodiments, the master station 502, HE stations 504, legacy stations 506, IoT devices 508, access gateways 512, Bluetooth™ devices, and/or sensor hubs 510 may remain in a power save mode until receiving a wake-up packet.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the master station 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11ax embodiments, a master station 502 may operate as a master station which may be arranged to contend for a wireless medium (e.g., during a contention period) to receive exclusive control of the medium for an HE control period. In some embodiments, the HE control period may be termed a transmission opportunity (TXOP). The master station 502 may transmit a HE trigger frame, which may be a trigger packet or HE control and schedule transmission, at the beginning of the HE control period. The master station 502 may transmit a time duration of the TXOP and sub-channel information. During the HE control period, HE stations 504 may communicate with the master station 502 in accordance with a non-contention based multiple access technique such as OFDMA or MU-MIMO.

This is unlike conventional wireless local-area network (WLAN) communications in which devices communicate in accordance with a contention-based communication technique, rather than a multiple access technique. During the HE control period, legacy stations refrain from communicating.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In some embodiments, the HE station 504 and/or master station 502 may be configured to operate in accordance with IEEE 802.11mc. In example embodiments, the radio architecture of FIG. 1 is configured to implement the HE station 504 and/or the master station 502. In example embodiments, the front-end module circuitry of FIG. 2 is configured to implement the HE station 504 and/or the master station 502. In example embodiments, the radio IC circuitry of FIG. 3 is configured to implement the HE station 504 and/or the master station 502. In example embodiments, the base-band processing circuitry of FIG. 4 is configured to implement the HE station 504 and/or the master station 502. In example embodiments, the radio architecture of FIG. 1, the front-end module circuitry of FIG. 2, the radio IC circuitry of FIG. 3, and/or the base-band processing circuitry of FIG. 4 may be configured to perform the methods and functions herein described in conjunction with FIGS. 1-17.

In example embodiments, The master station 102 may also communicate with legacy stations 106, sensor hubs 110, access gateway 112, and/or HE stations 104 may include one or more of the following: the radio architecture of FIG. 1, the front-end module circuitry of FIG. 2, the radio IC circuitry of FIG. 3, and/or the base-band processing circuitry of FIG. 4.

The master station 102 may also communicate with legacy stations 106, sensor hubs 110, access gateway 112, and/or HE stations 104 in accordance with legacy IEEE 802.11 communication techniques. In example embodiments, a master station 102, access gateway 112, HE station 104, legacy station 106, IoT devices 108, and/or sensor hub 110 may be configured to perform the methods and functions herein described in conjunction with FIGS. 1-17. In example embodiments, an apparatus of a master station 102, an apparatus of an access gateway 112, an apparatus of a HE station 104, an apparatus of a legacy station 106, apparatus of an IoT devices 108, and/or an apparatus of a sensor hub 110 may be configured to perform the methods and functions herein described in conjunction with FIGS. 1-17.

Figure 6:
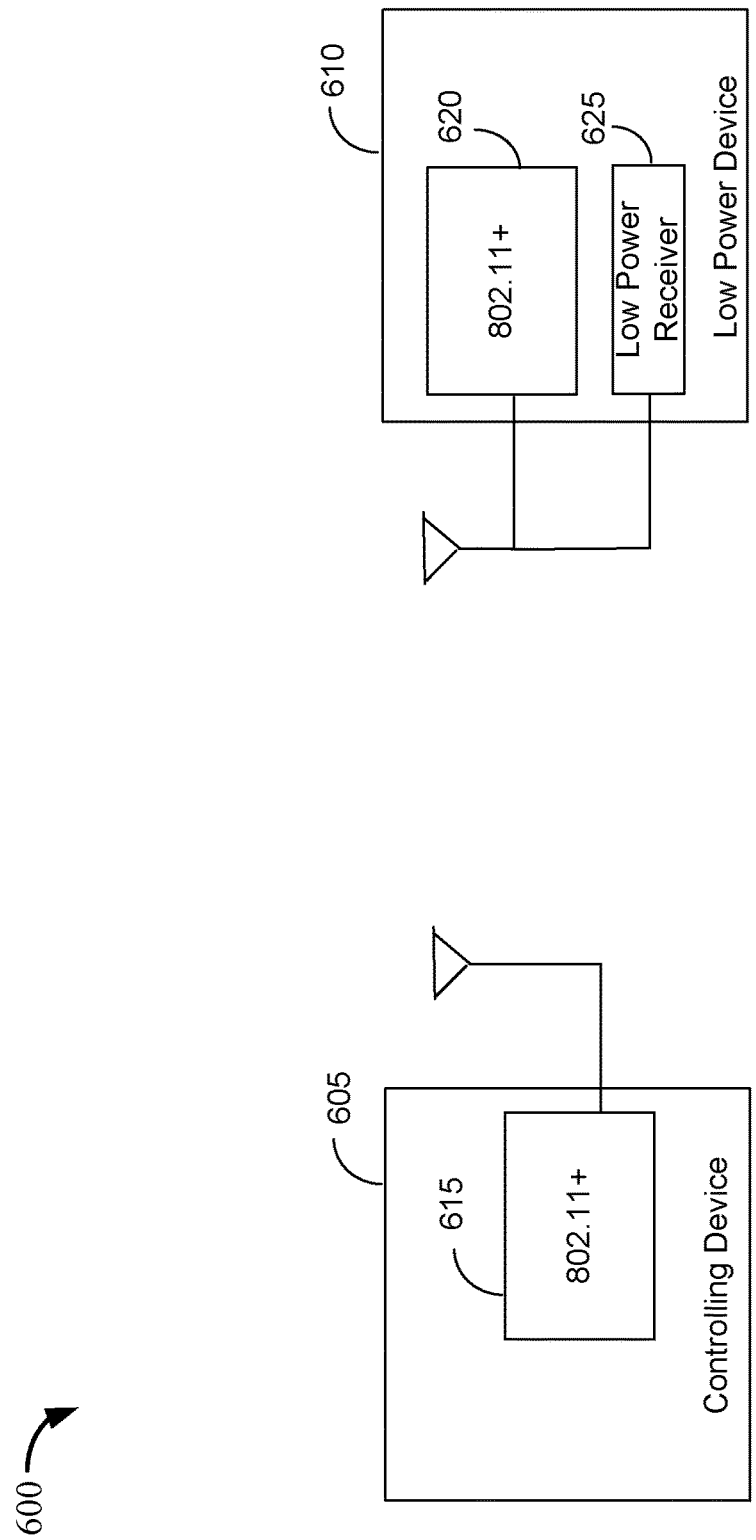
FIG. 6 illustrates an example Low Power Wake-up Receiver (LP-WUR) for Wi-Fi, e.g. (IEEE 802.11) device, in accordance with some embodiments.

FIG. 6 shows two wireless devices in communication. A first station 605 is in communication with a second station 610. In various embodiments, the devices 605 and/or 610 discussed below with respect to FIG. 6 may be any of the devices discussed above with respect to FIG. 5. The first station 605 include a transceiver 615, that is configured to perform one or more 802.11 communication protocols. The first station 605 may be a controller in some aspects. For example, in some aspects, the first station 605 may be an access point. In some aspects, the first station may not enter a low power state.

The second station 610 may also include a transceiver 620, which may be configured to operate in accordance with one or more 802.11 communication protocols. In some embodiments, the device 610 may operate in at least one of two power modes. A first power mode may provide for use of the transceiver 620 for communication on the wireless network. For example, in the first power mode, the transceiver 620 may communicate with the transceiver 615 of device 605. In a second power mode (e.g. a low power mode), the transceiver 620 may consume less power than when operating in the first power mode. In the second power mode, the transceiver 620 may be unable to communicate on the wireless network. For example, communication with the transceiver 615 may be impossible in the second power mode.

Device 610 also includes a low power wake-up receiver 625. The low power wake-up receiver 625 may provide for reduced power consumption of the device 610, while still allowing the device 610 to operate on the wireless network. For example, in some aspects, under certain conditions, the transceiver 620 may enter the second (low) power mode.

The device 605 may then transmit a wake-up signal, via the transceiver 615, to the low power receiver 625. Upon receiving the wake-up signal, the low power receiver 625 may signal the transceiver 620 to transition from the second power mode to the first power mode. After the transceiver 620 transitions from the second power mode to the first power mode, the transceiver 620 may be able to communicate with the transceiver 615.

While the discussion of FIG. 6 above describes the transceivers 615 and 620, each of devices 605 and 610 may alternatively be equipped with separate transmitter and receivers, without departing from the spirit of the subject matter contained.

Figure 7:
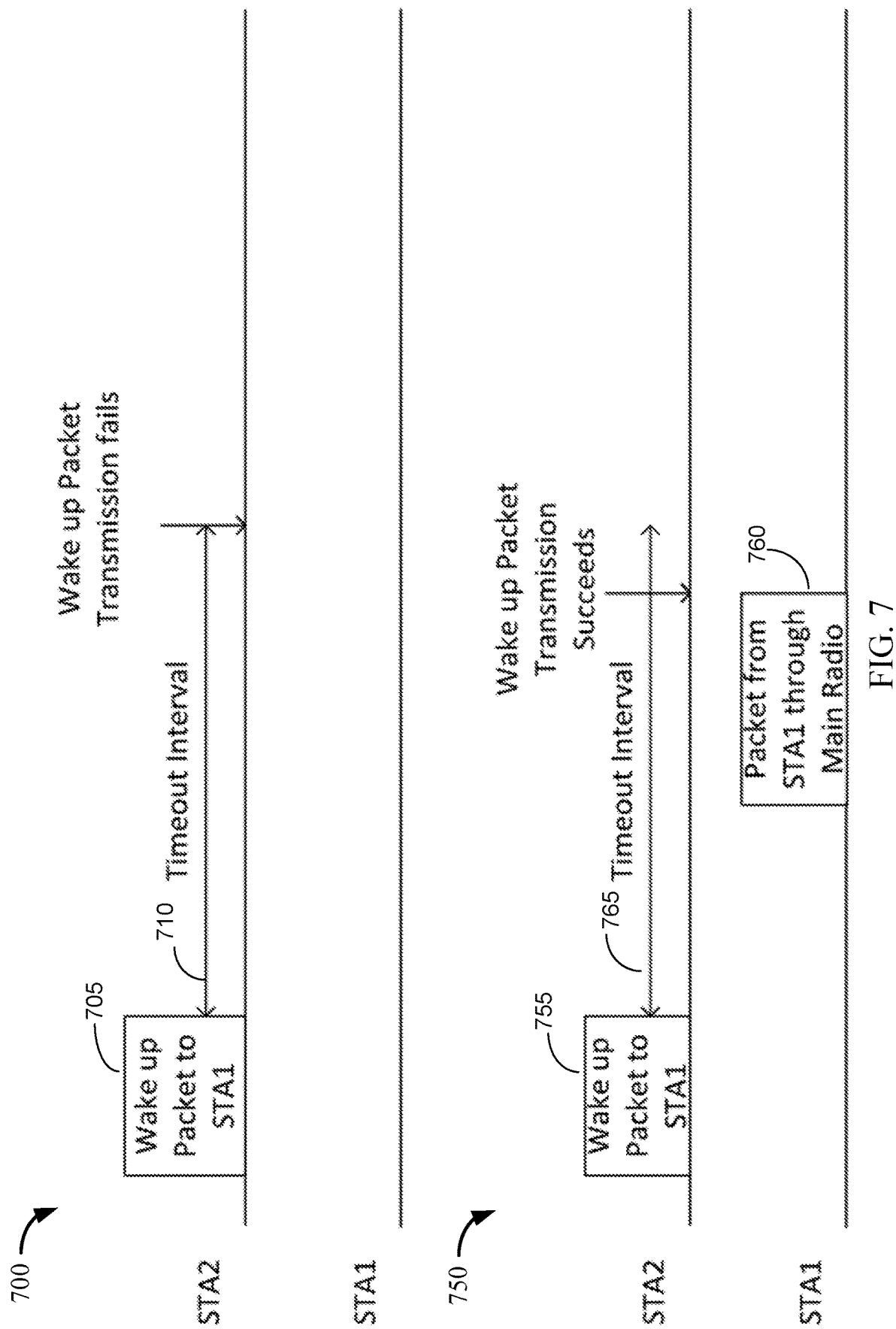
FIG. 7 illustrates an example of a wake-up packet acknowledgement procedure, in accordance with some embodiments.

FIG. 7 illustrates an example 700 of a wake-up packet acknowledgement procedure 700 in accordance with some of the disclosed embodiments.

FIG. 7 shows two different communication exchanges between two stations. In the first scenario 700, STA2 transmits a wake-up packet 705 to STA1. A timeout interval 710 may be defined for the wake-up protocol utilized by STA1 and STA2. The protocol may indicate that if no acknowledgment of the wake-up packet 705 is received before the expiration of the timeout period 710, STA2 is to operate as if STA1 did not receive the wake-up packet 705. For example, in some aspects, STA2 may retransmit the wake-up packet 705 if no response is received within the timeout period 710. In scenario 700, no packet is received from STA 1 within the timeout period.

In communication exchange 750, a wake-up packet 755 is transmitted by STA2. A response 760 is received from STA1 before the expiration of the time out period 765. In some aspects, the response 760 may be an explicit acknowledgment of the wake-up packet 755. In some other aspects, the response 760 may be any other packet transmitted from the STA1 to the STA2. The STA2 may treat this packet as an acknowledgment of the wake-up signal 755.

In some embodiments, STA2 and STA1 may negotiate the wake-up radio (WUR) capability demonstrated in FIG. 7. In some aspects, a value for the timeout periods 710 and/or 765 may also be negotiated.

One characteristic of the wake-up procedure illustrated in FIG. 7 is that the STA2 may need to wait for the full timeout interval (e.g. 710 and/or 765) without transmitting any other packets to any other devices. Thus, waking up STA1 may have effects on STA2's ability to maintain network throughput.

Figure 8:
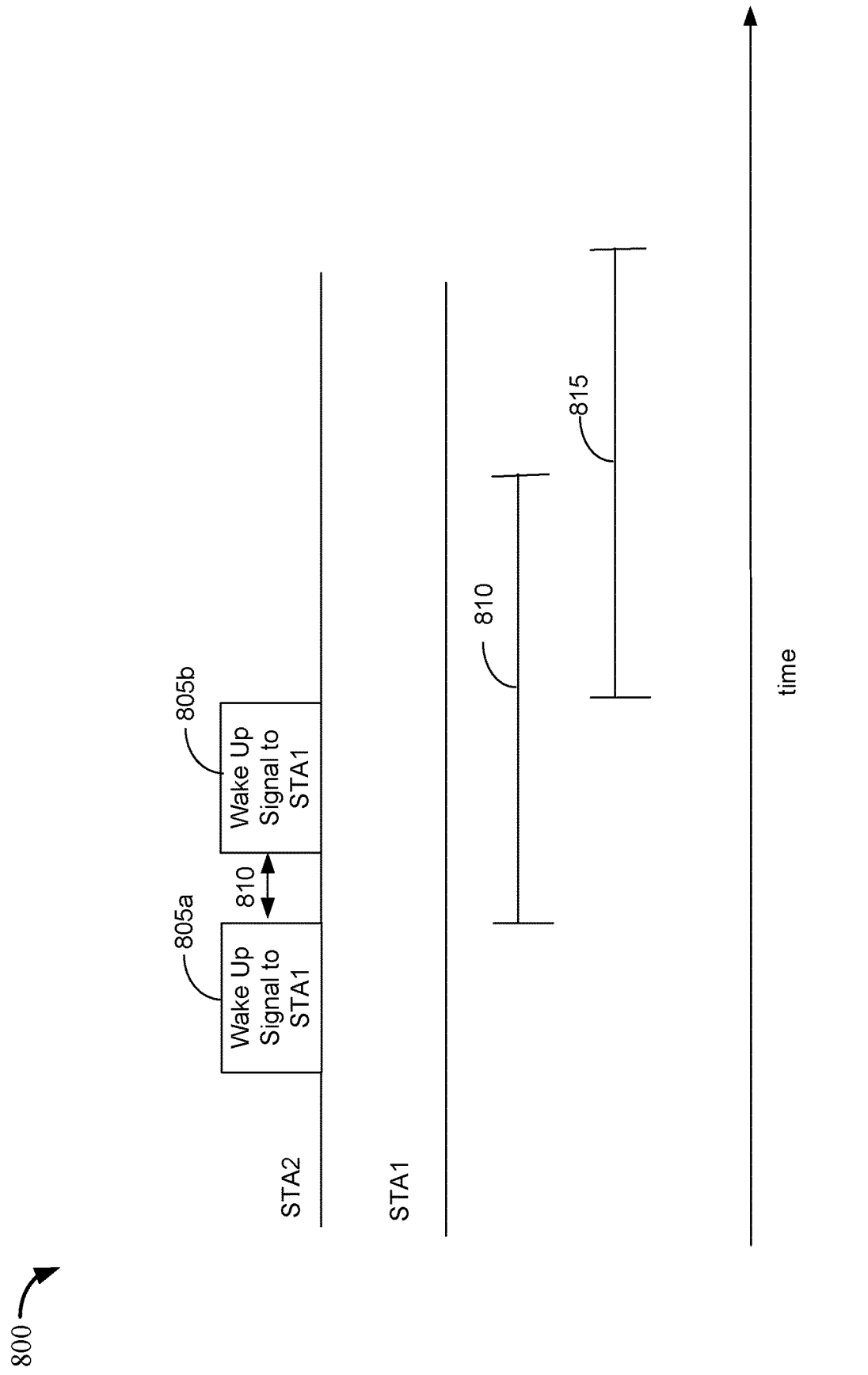
FIG. 8 illustrates an example of a wake-up packet acknowledgement procedure, in accordance with some embodiments.

FIG. 8 illustrates an example communicate exchange between two stations. FIG. 8 illustrates that in some aspects, STA2 may not wait for an acknowledgment from STA1 before retransmitting a wake-up signal. Thus, communication exchange 800 shows that STA 2 transmits a first and second wake-up signal 805a-b respectively. In some aspects, the two wake-up signals may be separated by an interframe spacing time period 810, such as a SIFS. By transmitting two wake-up signals 805a-b, the STA2 may increase the probability that at least one wake-up signal is successfully received by STA1.

FIG. 8 also shows an example of resetting a time out period for a wake-up signal. Some of the disclosed embodiments provide for a resetting of a timeout interval for a wake-up signal, such as the wake-up signals 805a-b shown in FIG. 8. For example, FIG. 8 illustrates that in some aspects, the STA2 may begin a first time out interval 810 upon transmission of the first wake-up signal 805a. The first time out interval 810 may be reset in favor of a second timeout interval 815 upon transmission of the second wake-up signal 805b.

Various embodiments of the disclosed methods, systems, and devices may utilize different procedures for determining retransmission criteria for a wake-up signal, such as the wake-up signals discussed above with respect to FIGS. 6-8.

Figure 9:
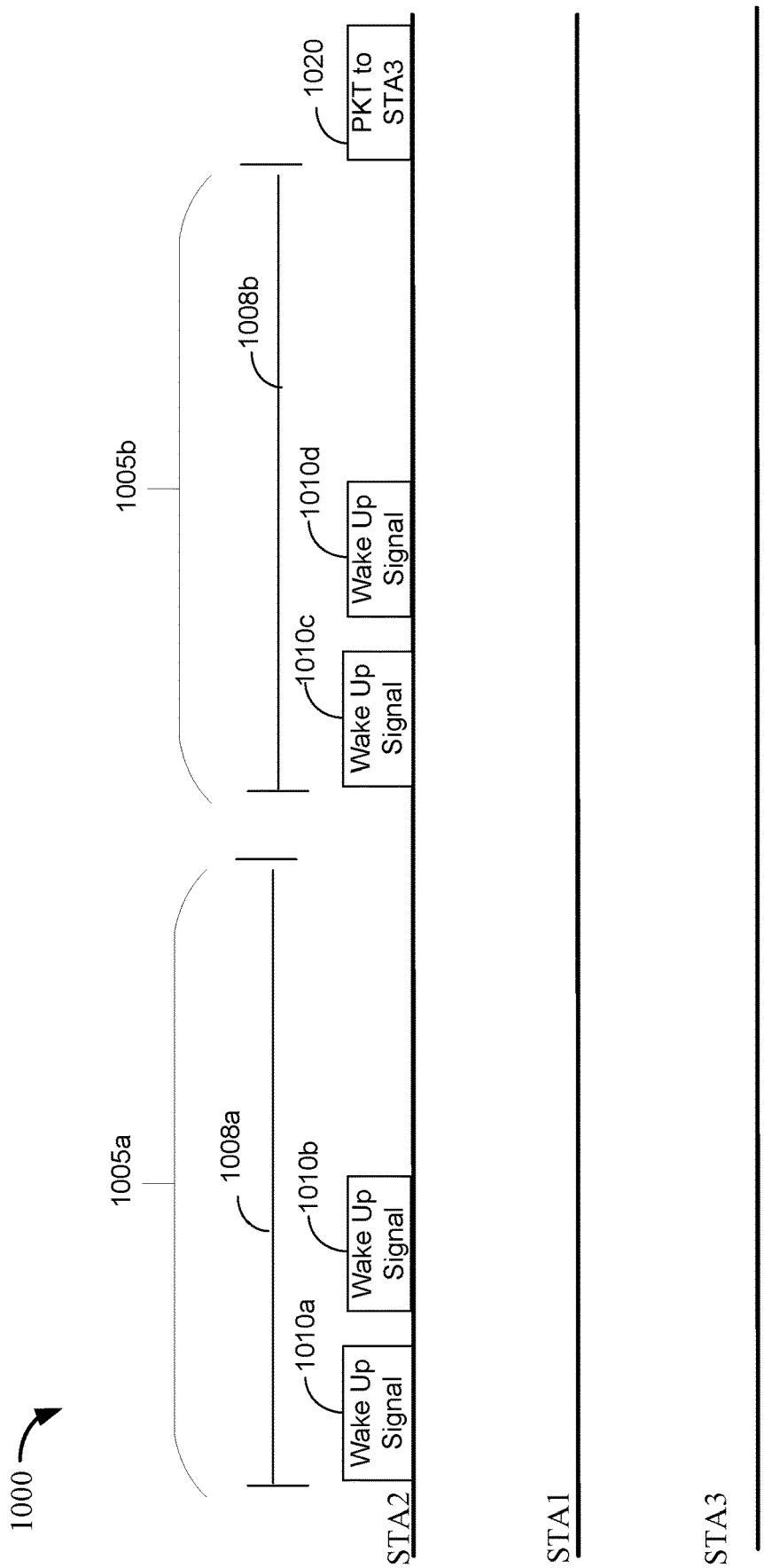
FIG. 9 illustrates an example of a wake-up packet acknowledgement procedure in accordance with some embodiments.

FIG. 9 illustrates a first embodiment (option 1) of a first station waking up a second station. In some embodiments, a wake-up signal to the second station (e.g. a station) may be retransmitted by the first station up to a threshold number of times. FIG. 9 illustrates two retransmission intervals 1005a-b. Each of the exemplary retransmission intervals 1005a-b includes two transmissions of a wake-up signal, 1010a-b and 1010c-d. As discussed above more than one wake-up signal may be transmitted within each of the retransmission intervals 1005a-b in order to increase the probability of a successful receipt of a wake-up signal at a receiving device. Each retransmission interval 1005a-b includes a timeout interval 1008a-b respectively. In some aspects, one or more of the timeout intervals 1008a-b may be 10 milliseconds. FIG. 9 shows the timeout interval measured from the transmission of a first wake-up signal (e.g. 1010a and 1010c) within a retransmission interval 1008a-b, but other embodiments may measure their timeout intervals from the last transmission of a wake-up signal within a retransmission interval (e.g. 1010b and 1010d).

If no response is received by the first station from the second station, the first station may terminate the wake-up operation. For example, in some aspects, an access point, acting as the first station, may deassociate with the second station after a threshold number of retransmission intervals 1005a-b without any response from the second station. In some aspects, the first station may instead just stop transmitting wake-up signals after the threshold number of retransmission intervals is reached. FIG. 9 shows no response from the second station (STA2) after two retransmission intervals. In some aspects, the first station (e.g. STA1) may have a threshold value of 1, 2, 3, 4, 5, 6, 7, 8, 9, 10, or any number of retransmission intervals 1005a-b. Each retransmission interval 1005a-b may include transmission of one or more wake-up signals (e.g. 1010a-d). In some aspects, a counter maintained by the first station of a number of retransmission intervals (e.g. 1005a-b) performed to the second station may be reset when either 1) a packet is received from the particular device 2) after a second threshold period of time expires and/or 3) after a power on-reset of the first station and/or 4) after a reassociation between the first station and the second station.

The counter may be compared to the threshold discussed above when determining whether to complete the wake-up attempt of the second station. In some aspects, after the threshold number of retransmission intervals (e.g. 1005a-b), the first station (e.g. STA2) may transmit a packet 1020 to a third device (e.g. STA3). In some aspects, the threshold number of retransmission intervals is negotiated between the first station and the second station. In some aspects, the capability to wake-up the second station via the wake-up packets 1010a-d is also negotiated by the first and second stations.

Figure 10:
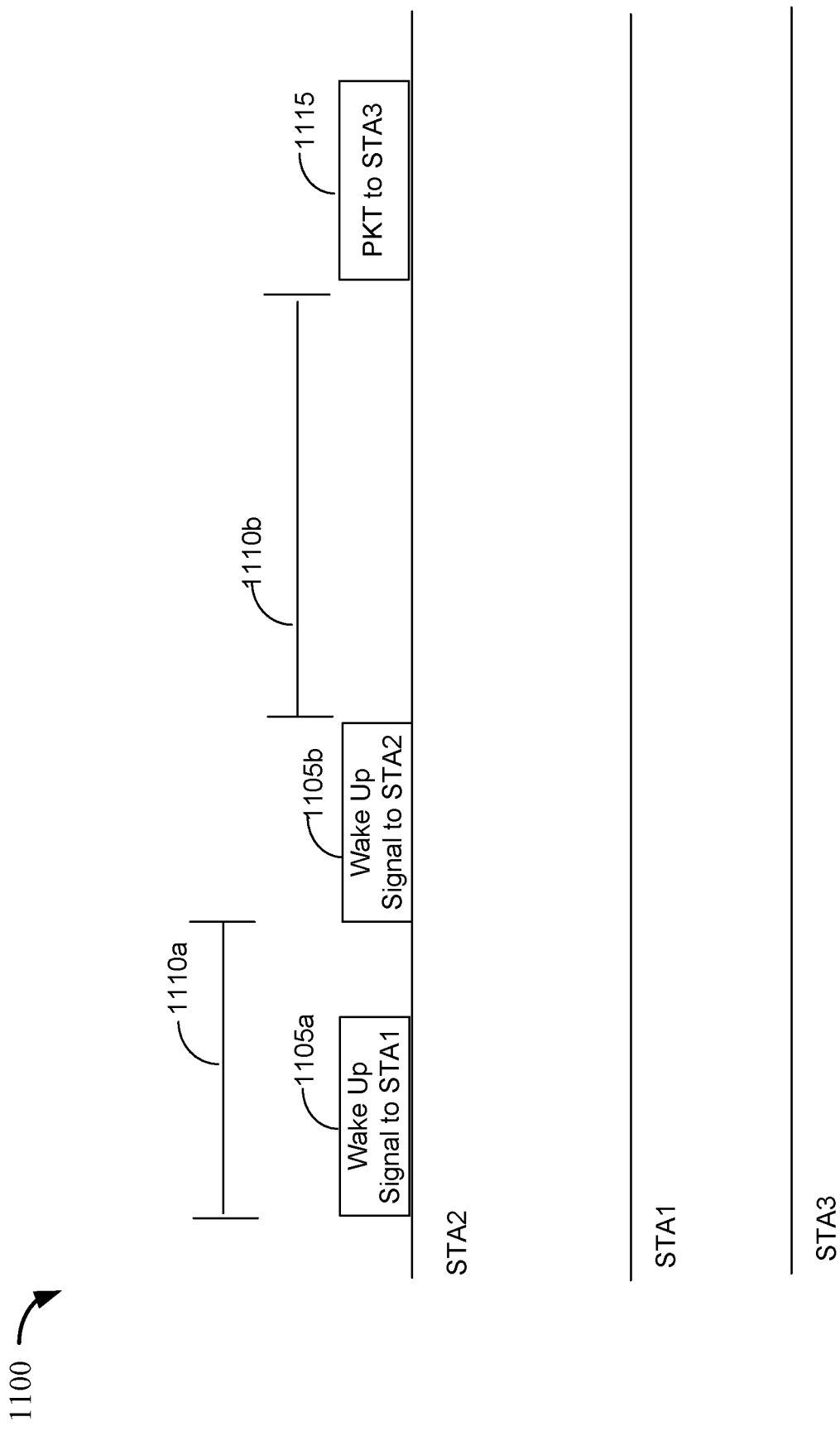
FIG. 10 illustrates an example of a wake-up packet acknowledgement procedure in accordance with some embodiments.

FIG. 10 illustrates a second embodiment of the first station transmitting a wake-up signal to the second station over a wireless network. Whereas the embodiment of FIG. 9 retransmitted wake-up signals for a threshold number of retransmission intervals, the embodiment of FIG. 10 retransmits wake-up signals for a threshold number of wake-up signals.

FIG. 10 shows transmission of two wake-up signals 1105a-b. Each of the wake-up signals 1105a-b may be followed by a timeout period 1110a-b respectively. In some aspects, one or more of the timeout intervals 1110a-b may be 10 milliseconds. After expiration of a threshold number of timeout periods 1110a-b without a response from the second station, the first station may stop attempting to wake-up the second station. Note that the threshold of FIG. 10 differs from that of FIG. 9 in that the threshold of FIG. 10 relates to a number of time out periods tied to individual transmissions of individual wake-up signals, whereas the threshold of FIG. 9 relates to a number of retransmission intervals that have expired, with each retransmission interval potentially including more than one wake-up signal. In some aspects, a counter maintained by the first station of a number of time out periods (e.g. 1110a-b) performed to the second station may be reset when either 1) a packet is received from the second station 2) after a second threshold period of time expires and/or 3) after a power on-reset of the first station and/or 4) after a reassociation between the first station and the second station.

In some aspects, after the wake-up process is stopped by the first station, the first station may be able to communicate with other devices on the wireless network. For example, FIG. 10 shows that the first station (e.g. STA2) transmits a packet 1115 to a third device (e.g. STA3) after (in response to the) expiration of the second timeout period 1010b.

Figure 11:
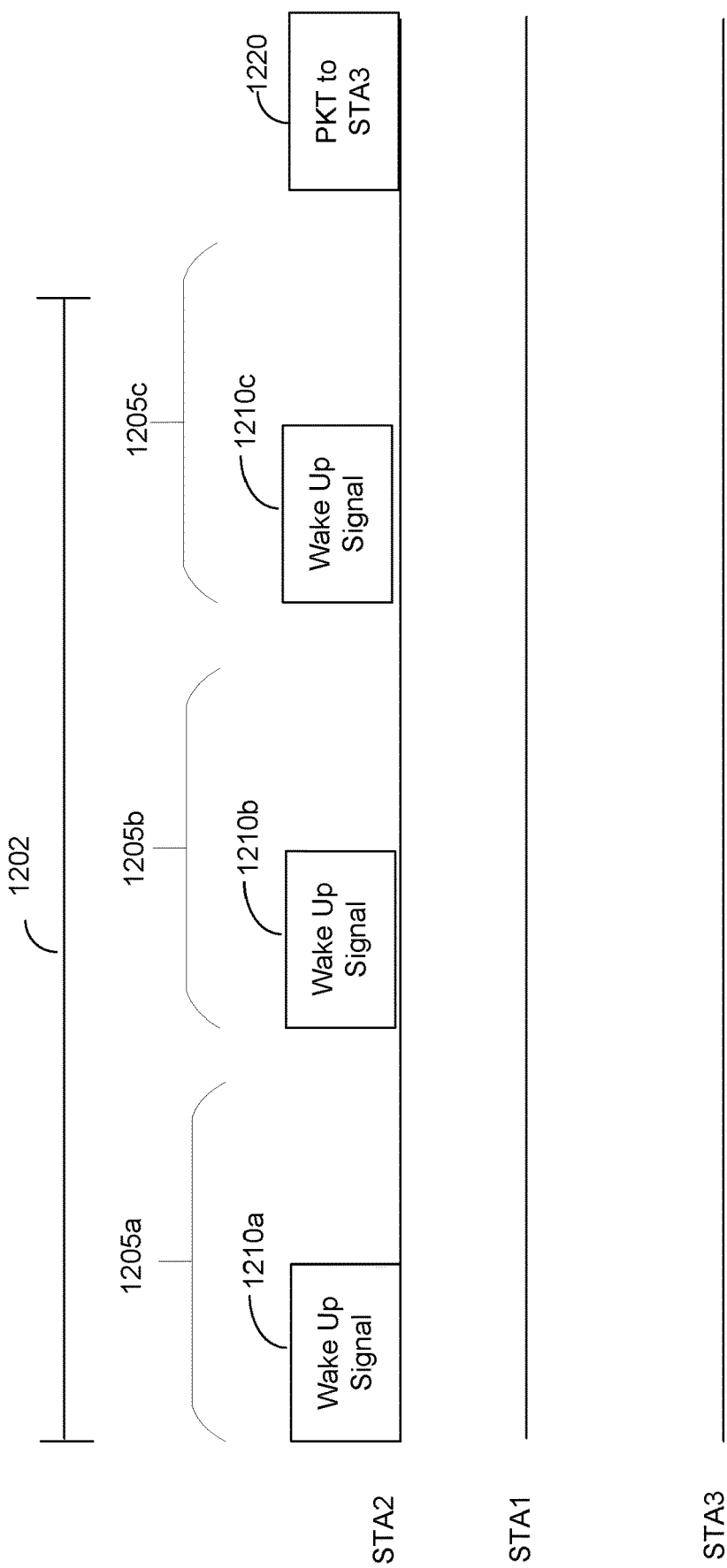
FIG. 11 illustrate an example of a wake-up packet acknowledgement procedure in accordance with some embodiments.

FIG. 11 shows a third embodiment of the first station transmitting a wake-up signal to the second station over a wireless network. The embodiment of FIG. 11 differs from those of FIGS. 9-10 at least in that the wake-up process between the first station and second station is limited to a maximum time period 1202. Within the maximum time period 1202, any number of wake-up signals (three wake-up signals 1210a-c shown in FIG. 11) and/or retransmission intervals (three retransmission intervals 1205a-c shown in FIG. 11) may be included. While FIG. 11 shows one wake-up signal 1210a-c in each of retransmission intervals 1205a-c respectively, other embodiments may have more than one wake-up signal in one or more retransmission intervals. In some aspects, if the end of the time interval 1202 has not been reached, a wake-up signal may be transmitted to the second station (e.g. STA1) by the first station (e.g. STA2).

After expiration of the maximum time period 1202, the first station (e.g. STA2) may transmit a packet 1220 to a third device (e.g. STA3). In some aspects, a new maximum time period 1202 may be initiated after one or more conditions, such as 1) a power on reset of the first station 2) a disassociation/reassociation between the first station and second station 3) a packet from the second station being received by the first station.

Figure 12:
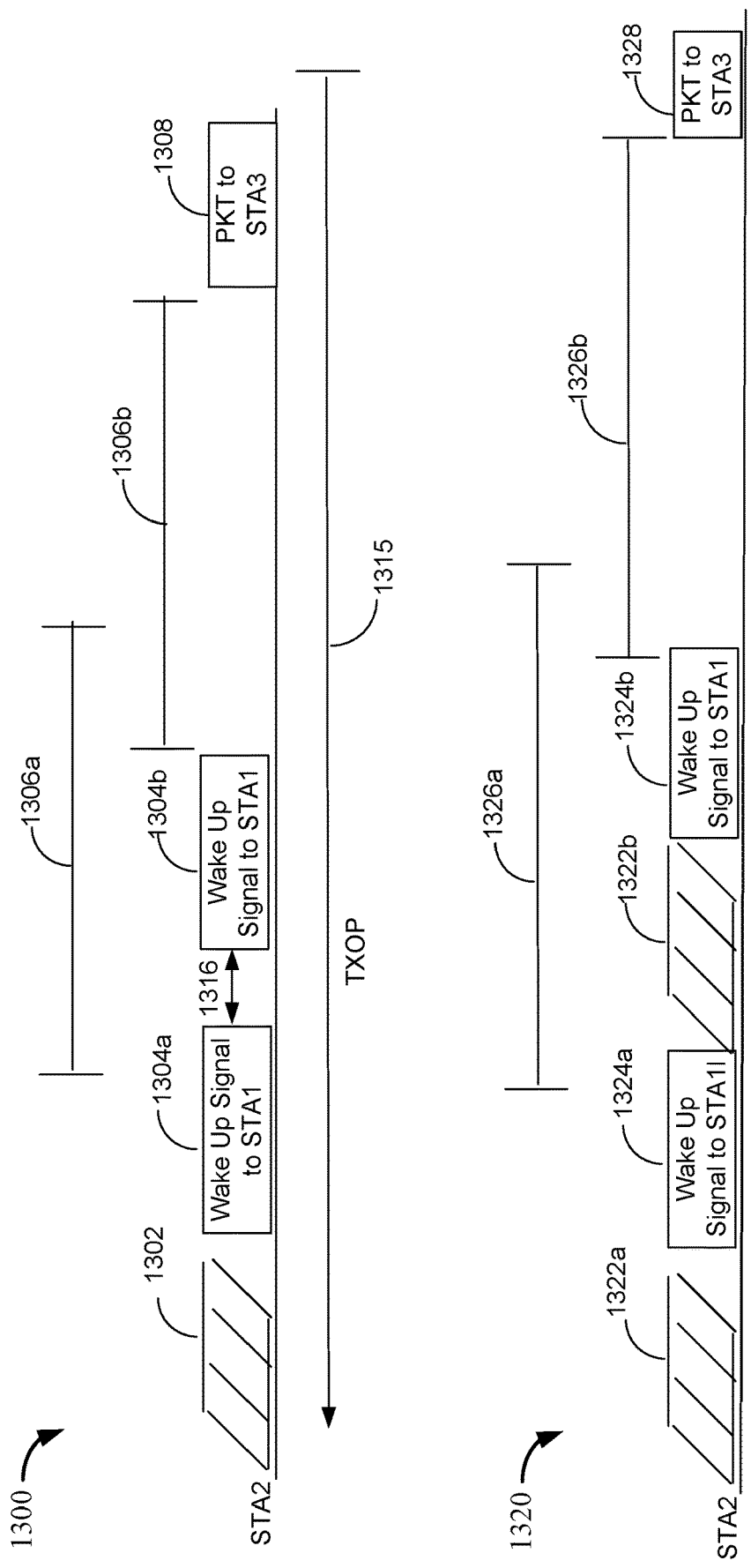
FIG. 12 illustrates a HE station in accordance with some embodiments.

FIG. 12 illustrates two embodiments of the first station transmitting wake-up signals to a second station. In a first embodiment 1300 of FIG. 12, the first station (e.g. STA2) performs a back-off procedure 1302 before transmitting a first wake-up signal 1304. A timeout period 1306a is defined for the first wake-up signal 1304. Before the timeout period 1306a expires, the first station may transmit a second wake-up signal 1304b. This may reset the timeout period 1306a and define a second timeout period 1306b. If no response from the second station is received by the first station within the timeout period 1306b, the first station may transmit a packet 1308 to another device (e.g. STA3).

The transmission of the wake-up signal 1304b may, in some aspects, be permitted under certain conditions. These conditions may include one or more of 1) the transmission of the wake-up signal 1304b does not violate a TXOP limit. In other words, the wake-up signal 1304b occurs within the same TXOP 1315 as the transmission of the wake-up signal 1304a, 2) the wake-up signal 1304b is addressed to the same device as the wake-up signal 1304a, and 3) the wake-up signal 1304b follows wake-up signal 1304a by at least an interframe space time 1316.

The second embodiment 1320 of FIG. 12 is similar to that of embodiment 1300, in that it includes the transmission of two wake-up signals 1324a-b, each with a corresponding timeout period 1326a-b respectively. The first wake-up signal 1324a is also preceded by a back-off procedure 1322a. One difference between embodiment 1320 and embodiment 1300 is that embodiment 1320 performs a second back-off procedure 1322b prior to transmitting the second wake-up signal 1324b. If no response is received from the second station within the timeout periods 1326a-b, the first station (e.g. STA2) may transmit a packet 1328 to a third device (e.g. STA3). In the embodiment 1320 of FIG. 12, the additional transmission of the wake-up signal 1324b does not update a contention window or a retry count.

Figure 13:
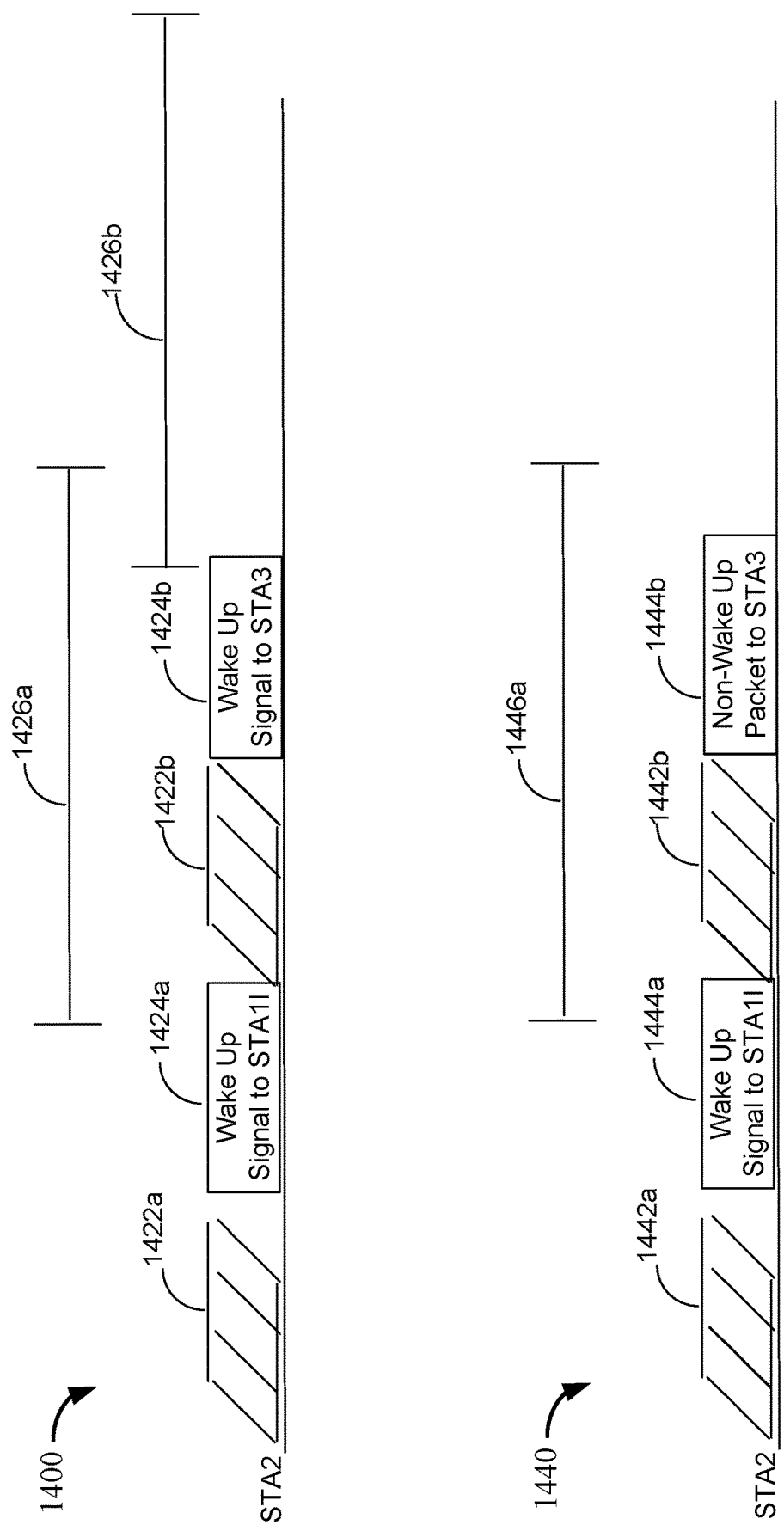
FIG. 13 shows two embodiments of transmitting a wake-up signal by a first station to a second station.

FIG. 13 shows two embodiments of transmitting a wake-up signal by a first station to a second station. The embodiment 1400 of FIG. 13 shows the first station (e.g. STA2) performing a back-off procedure 1422a before transmitting a wake-up signal 1424a to the second station (e.g. STA1). The wake-up signal 1424a has an associated timeout period 1426a. Embodiment 1400 then shows a second back-off procedure 1422b being performed by the first station. After successful completion of the second back-off procedure 1422b, the first station transmits a second wake-up signal 1424b to a different device, that is in the embodiment 1400 of FIG. 13, STA 3, whereas the first wake-up signal 1424a was transmitted to STA1. In this case, the transmission of the second wake-up signal 1424b does not reset the timeout interval 1426a for the first wake-up signal 1424a, since the second wake-up signal 1424b is transmitted to a different device than the first wake-up signal 1424a. Instead, a second timeout period 1426b is provided for the second wake-up signal 1424b. Thus, the first station may maintain two timeout periods simultaneously, with each timeout period having independent start and end times, for the two wake-up signals 1425a-b respectively. The embodiment 1400 of FIG. 13 shows that the first station may transmit packets to other devices while waiting for a response to a wake-up signal from the second (and potentially third) devices.

The embodiment 1440 of FIG. 13 shows transmission of a wake-up signal 1444a by the first station (e.g. STA2) to a second station. The transmission of the wake-up signal 1444a is performed in response to completion of a back off procedure 1442a. The wake-up signal 1444a has a corresponding timeout period 1446a. The first station (e.g. STA2) transmitting the wake-up signal 1444a waits during the timeout period 1446a for a response from the second station. During the timeout period 1446a, the first station (e.g. STA2) may perform a second backoff procedure 1442a. Upon successful completion of the second back-off procedure 1442b during the timeout period 1446a, the first station (e.g. STA2) may transmit a packet 1444b to a third wireless device (e.g. STA3). The packet may not be a wake-up packet. Instead, the packet may include an 802.11 preamble and a media access control header in some aspects.

Figure 14:
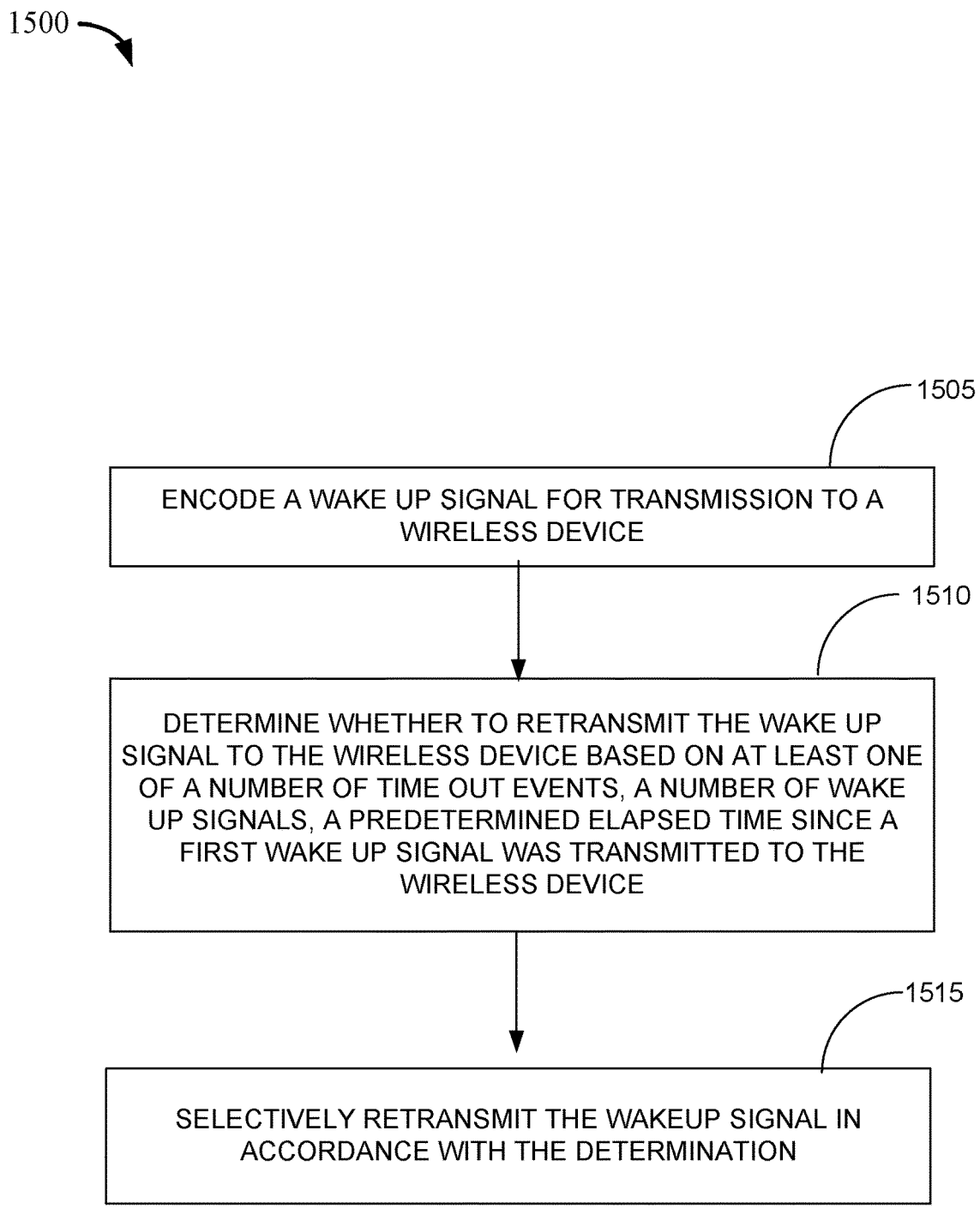
FIG. 14 is a flowchart of an exemplary method of transmitting a wake-up signal to a wireless device.

FIG. 14 is a flowchart of an exemplary method of transmitting a wake-up signal to a wireless device. In some aspects, one or more of the functions discussed below with respect to FIG. 14 and process 1500 may be performed by the application processor 110, discussed above with respect to FIG. 1. For example, instructions stored in an electronic memory, which may be integrated with the application processor 110 or be a separate component, may configure the application processor 110 to perform one or more of the functions discussed below. In some aspects, the application processor 110 may comprise multiple physically separate hardware processors.

Process 1500 discussed below provides for a first station transmitting a wake-up signal to improve utilization of the wireless network while waiting for a second station receiving the wake-up signal to respond to it. In some aspects, if a device receiving the wake-up signal is in a low power state, the wake-up signal may be received by a low power receiver, such as the low power receiver 625 discussed above with respect to FIG. 6. The low power receiver 625 may, upon reception of the wake-up signal, initiate a power up of the wireless transceiver 620. The power up process of the wireless transceiver may take some period of time. Until the power up process of the wireless transceiver 620 is complete, a response to the wake-up signal may not be transmittable by the receiving device. Furthermore, during this waiting period, the first station is not able to exchange data with the second device. For example, since the first station has no indication the second station is awake and receiving data on the wireless network until an acknowledgment is received, the first station may inhibit data communication with the second device until the acknowledgment is received. Inhibiting data communication may include most wireless network packet exchanges except transmission of wake-up signals and/or receipt of an acknowledgment of a wake-up signal from the second station. Upon receipt of the acknowledgment from the second station, the first station may recognize that the second device is awake and able to communicate on the wireless network. Receipt of the acknowledgement may cause the first station to perform data communication with the second station (beyond wake-up signals and acknowledgments of same). For example, the first and second stations may exchange ps-poll messages, RTS/CTS messages, data messages, or other messages after receipt of the acknowledgment from the second station by the first station.

During this waiting period, the first station is waiting for a response to the wake-up signal from the second station. This waiting period represents a lost opportunity for use of the wireless medium. For example, in some aspects, the waiting period may occur within a transmission opportunity of the first station. Since the transmission opportunity may be a non-contention period during which other devices refrain from transmitting on the network, the waiting period may be devoid of wireless transmissions unless the first station is able to use this waiting period for additional transmissions. By retransmitting the wake-up signal, and/or transmitting a packet to another device during the waiting period for the wake-up signal, process 1500 below improves utilization of the wireless network. Process 1500 may be performed in some aspects, by the first station discussed above. For purposes of discussion, a device performing process 1500 is referred to below as the "executing device." In various aspects of process 1500, process 1500 may perform one or more of the functions of STA2 discussed above in any of FIGS. 7-12.

In block 1505, a wake-up signal is encoded for transmission to the second station. Block 1505 may also include transmitting the encoded wake up signal in some aspects. The wake-up signal may be transmitted as part of an attempt to wake-up the second station. In some aspects, while the attempt to wake-up the second station is in process, the first station may be restricted to certain communication operations on the wireless network. For example, the first station may not be able to signal that it may receive data from other wireless devices while the attempt is in process.

In some aspects, before block 1505 transmits the wake-up signal, a back off procedure may be performed. For example, as discussed above with respect to embodiment 1320, the example back-off procedure 1322a may be performed prior to transmission of the wake-up signal 1324a.

In some aspects, the wake-up signal may be a signal to a low power receiver in the second station. The wake-up signal may not be a traditional 802.11 packet in some aspects. For example, the wake-up signal may not include a media access control header. In some aspects, the wake-up signal may not include a preamble. Alternatively, in some aspects, the wake-up signal may include a preamble having a first format, whereas other 802.11 packets, such as a data packet, utilize a different preamble format. For example, in some aspects, the wake-up signal may include a pseudo noise (PN) sequence to facilitate detection of a start of the wake-up signal. In some of these aspects, other 802.11 packets, such as data packets may utilize a more traditional preamble having one or more short training fields, long training fields, and signal fields. In some aspects, the wake-up signal may be transmitted using on-off keying (OOK) modulation. Other 802.11 packets, such as data packets may utilize a different modulation than the wake-up signal, such as BPSK, 16 QAM, 64 QAM, 256 QAM, or other modulations.

Block 1510 determines whether to retransmit the wake-up signal to the second station. In some aspects, the determination is based on a number of timeout events for wake-up signals transmitted to the second station. In some aspects, a timeout event occurs 10 milliseconds after transmission of a wake-up signal. Other aspects utilize different amount of time for a timeout event. In some aspects, if the number of timeout events exceeds a predetermined threshold of timeout events, the executing device may stop attempting to wake-up the second station. In this case, the executing device may determine to not retransmit the wake-up signal. Otherwise, a determination to retransmit the wake-up signal may be made in these aspects.

Completion of an attempt to wake-up the second station may provide for the executing device to communicate on the wireless network without restriction with respect to the wake-up process of the second station. For example, in some aspects, completion of the attempt to wake-up the second station may allow the executing device to receive data from other devices.

In some aspects, determination of whether to retransmit the wake-up signal is based on a number of a number of wake-up signals transmitted to the second station. If example, if the number of wake-up signals transmitted exceeds a maximum wake-up signal threshold, the executing device may end the attempt to wake-up the second station, and determine not retransmit the wake-up signal. Otherwise, the executing device may determine to retransmit the wake-up signal to the second station. The number of wake-up signals may be counted from a first wake-up signal transmitted to the second station, for example, since the second station moved into a low power state. Alternatively, the number of wake-up signals may be counted from a reset event, such as a reassociation with the second station, as discussed above.

In some aspects, whether to retransmit the wake-up signal is based on an elapsed time since a first wake-up signal was transmitted to the second station. If the elapsed time exceeds a maximum time threshold, the executing device may end the attempt to wake-up the second station, and determine not to retransmit the wake-up signal. Otherwise, the executing device may determine to retransmit the wake-up signal in some aspects.

In block 1515, the wake-up signal is selectively transmitted in accordance with the determination made in block 1510. In some aspects, block 1515 includes receiving a response to the wake-up signal from the second station.

In some aspects, process 1500 includes determining an expiration time of a timeout period for the wake-up signal transmitted in block 1505. As discussed with respect to embodiment 1440, a non-wake-up packet may be transmitted to a third wireless device before the expiration time.

In some aspects, before block 1515 retransmits the wake-up signal, a back off procedure may be performed. For example, as discussed above with respect to embodiment 1320, the example back-off procedure 1322b may be performed prior to retransmission of the wake-up signal 1324a as wake-up signal 1324b.

In some aspects, process 1500 may include receiving and decoding a message from the second device indicating a wake-up delay for the second device (e.g. via a field in the message set to a value of the wake-up delay). In these aspects, the first device may decode the message to determine the wake-up delay, and then determine a timeout period for a wake-up signal based on the decoded wake-up delay of the second device.

Figure 15:
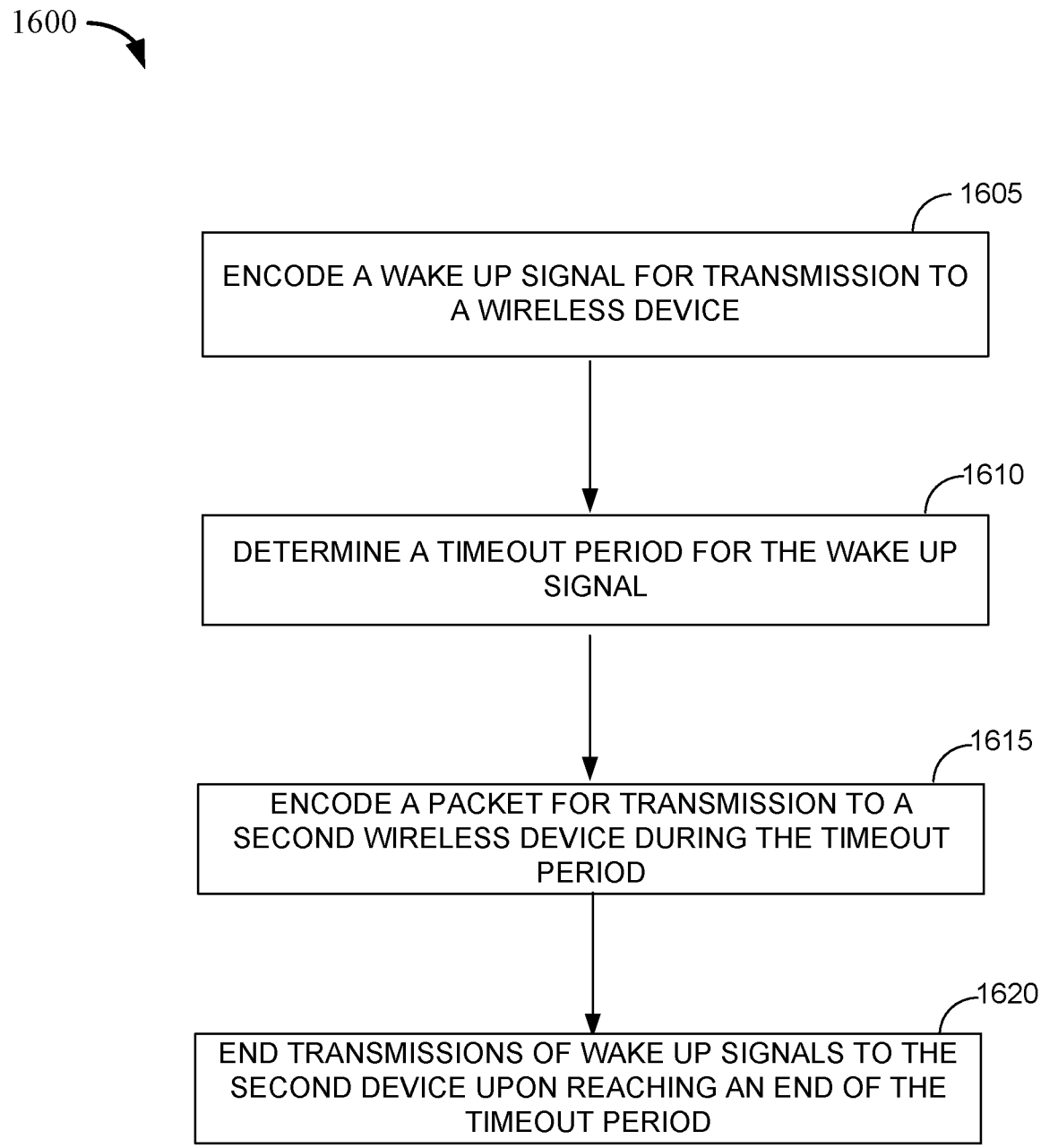
FIG. 15 is a flowchart of an exemplary method for utilization of a wireless medium.

FIG. 15 is a flowchart of an exemplary method for utilization of a wireless medium. In some aspects, one or more of the functions discussed below with respect to FIG. 15 and process 1600 may be performed by the application processor 110, discussed above with respect to FIG. 1. For example, instructions stored in an electronic memory, which may be integrated with the application processor 110 or be a separate component, may configure the application processor 110 to perform one or more of the functions discussed below. In some aspects, the application processor 110 may comprise multiple physically separate hardware processors.

Process 1600 discussed below provides for a first station encoding and transmitting a wake-up signal to improve utilization of the wireless network while waiting for a second station receiving the wake-up signal to respond to the wake-up signal. In some aspects, if the second station receiving the wake-up signal is in a low power state, the wake-up signal may be received by a low power receiver integrated with the second station, such as the low power receiver 625 discussed above with respect to FIG. 6. The low power receiver 625 may, upon reception of the wake-up signal, initiate a power up of the wireless transceiver 620. The power up process of the wireless transceiver may take some period of time. Until the power up process of the wireless transceiver 620 is complete, a response to the wake-up signal may not be transmittable by the receiving device. During this time, the first station is waiting for a response to the wake-up signal from the second station. This waiting period represents a lost opportunity for use of the wireless medium. For example, in some aspects, the waiting period may occur within a transmission opportunity of the first station. Since the transmission opportunity is a non-contention period during which other devices refrain from transmitting on the network, the waiting period may be devoid of wireless transmissions unless the first station is able to use this waiting period for additional transmissions. By retransmitting the wake-up signal, and/or transmitting a packet to another device during the waiting period for the wake-up signal, process 1600 below improves utilization of the wireless network. Process 1600 may be performed in some aspects, by the first station discussed above. For purposes of discussion, a device performing process 1600 is referred to below as the "executing device." In various aspects of process 1600, process 1600 may perform one or more of the functions of STA2 discussed above in any of FIGS. 7-12.

In block 1605, a wake-up signal is encoded for transmission to a wireless device. In some aspects, block 1605 also includes transmitting the wake up signal to the wireless device. The wake-up signal may be transmitted as part of an attempt to wake-up the wireless device. In some aspects, while the attempt to wake-up the wireless device is in process, the executing device may be restricted to certain communication operations on the wireless network. For example, the executing device may not be able to signal that it may receive data from other wireless devices while the attempt is in process.

In some aspects, before block 1605 transmits the wake-up signal, a back off procedure may be performed. For example, as discussed above with respect to embodiment 1440, the example back-off procedure 1442a may be performed prior to transmission of the wake-up signal 1444a.

In some aspects, the wake-up signal may be a signal to a low power receiver in the wireless device. The wake-up signal received by the second device may be of substantially different design than 802.11 packets that may be received by the transceiver/receiver 620. For example, the wake-up signal may be received over different frequency channels and/or may be substantially shorter in length than 802.11 packets received by the receiver 620. For example, in some aspects, the wake-up signal may not include an 802.11 preamble and/or media access control header. In some aspects, the wake-up signal may identify (e.g. via a field set to an identifier of) the second device, as a device to which the wake-up signal is addressed. In some aspects, the wake-up signal may also identify a device transmitting the wake-up signal (e.g. via a field set to a station address of the device transmitting the wake-up signal).

In some aspects, the wake-up signal may not include a preamble. Alternatively, in some aspects, the wake-up signal may include a preamble having a first format, whereas other 802.11 packets, such as a data packet, utilize a different preamble format. For example, in some aspects, the wake-up signal may include a pseudo noise (PN) sequence to facilitate detection of a start of the wake-up signal. In some of these aspects, other 802.11 packets, such as data packets may utilize a more traditional preamble having one or more short training fields, long training fields, and signal fields. In some aspects, the wake-up signal may be transmitted using on-off keying (OOK) modulation. Other 802.11 packets, such as data packets may utilize a different modulation than the wake-up signal, such as BPSK, 16 QAM, 64 QAM, 256 QAM, or other modulations. In block 1610, a timeout period for the wake-up signal is determined. In some aspects, the timeout period may be 10 milliseconds. In some aspects, the timeout period may begin at either the beginning or end of the transmission of the wake-up signal.

In block 1615, a packet is encoded for transmission to a second station during the timeout period. In some aspects, block 1615 also includes transmitting the packet to the second station. For example, as shown in embodiment 1440 above, packet 1444b is transmitted during the timeout period 1446a for the wake-up signal 144a. The wake-up signal 1444a was transmitted to STA1, while packet 1444b is transmitted to a different device STA3 in the exemplary embodiment 1440.

In block 1620, transmissions of wake-up signals to the second device end upon reaching the end of the timeout period. For example, in some aspects, the executing device may transmit multiple wake-up signals to the second device over a first time period. In some aspects, a separate second timeout period for a single wake-up signal may be reset and re-determined after each transmission of a wake-up signal to the second device. Eventually, the first device may determine that no response is likely from the second device. For example, upon reaching an end of the first time period, there may be no further transmissions of wake-up signals to the second device by the first device unless a triggering event occurs, such as a reassociation between the first and second device. In some aspects, the first time period discussed here may share characteristics of time period 1202, discussed above with respect to FIG. 11.

In some aspects, process 1600 may include receiving a message from the second device indicating a wake-up delay for the second device (e.g. via a field in the message set to a value of the wake-up delay). In these aspects, the first device may decode the message to determine the wake-up delay, and then determine a timeout period for a wake-up signal based on the decoded wake-up delay of the second device.

Figure 16:
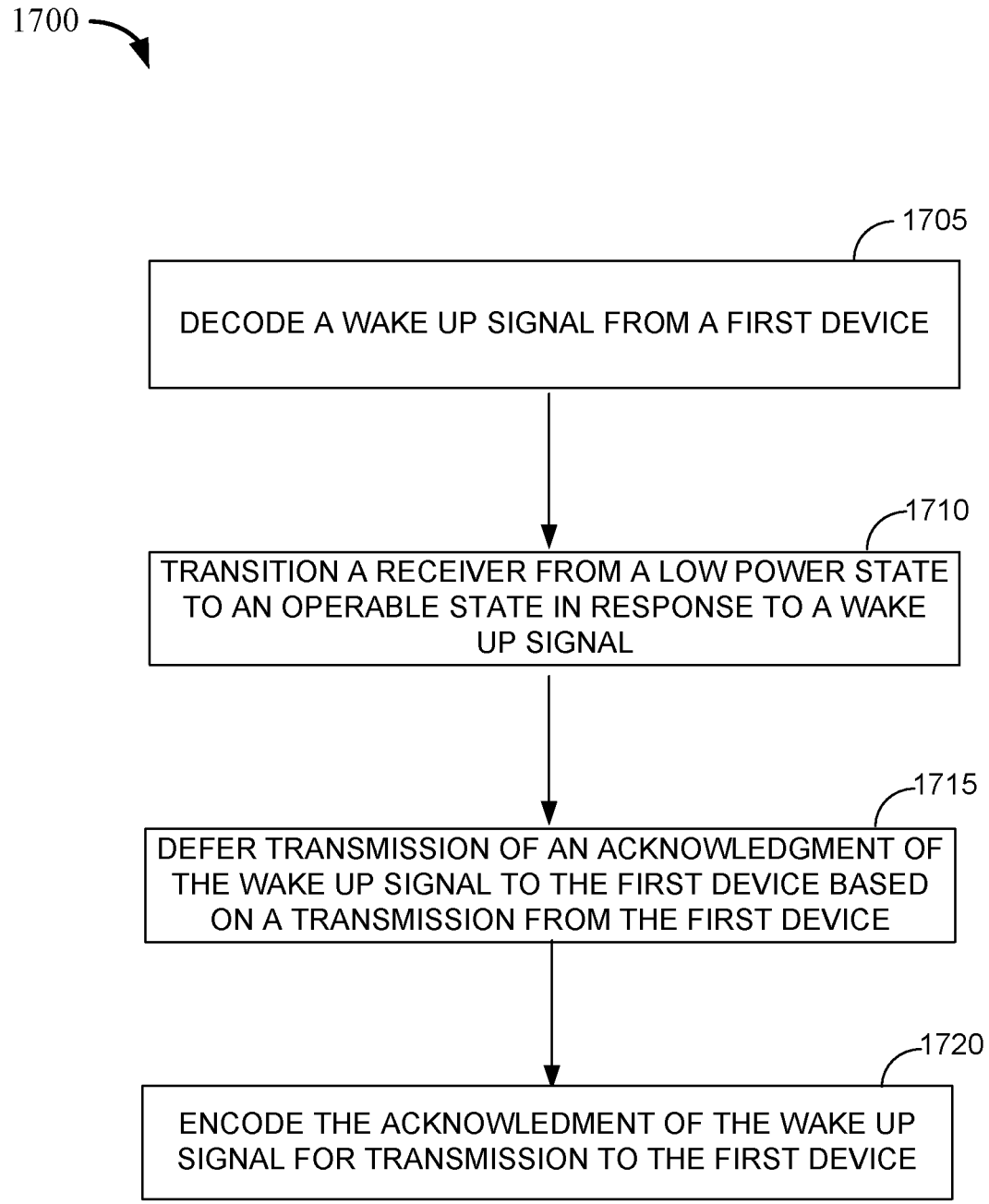
FIG. 16 is a flowchart of an exemplary method for responding to a wake-up signal from a first device.

FIG. 16 is a flowchart of an exemplary method for responding to a wake-up signal from a first device. The method of FIG. 16 may be performed in some aspects, by a second device, referred to below as an "executing" device. In some aspects, one or more of the functions discussed below with respect to FIG. 16 and process 1700 may be performed by the application processor 110, discussed above with respect to FIG. 1. For example, instructions stored in an electronic memory, which may be integrated with the application processor 110 or be a separate component, may configure the application processor 110 to perform one or more of the functions discussed below. In some aspects, the application processor 110 may comprise multiple physically separate hardware processors.

In block 1705, a wake-up signal from a first device s received and decoded by a second device. In some aspects, the wake-up signal may be received by a low power receiver, such as the low power receiver 625 discussed above with respect to FIG. 6. The low power receiver may be configured to operate using substantially less power than another receiver and/or transceiver integrated with the second device. The wake-up signal received by the second device may be of substantially different design than 802.11 packets that may be received by the transceiver/receiver 620. For example, the wake-up signal may be received over different frequency channels and/or may be substantially shorter in length than 802.11 packets received by the receiver 620. For example, in some aspects, the wake-up signal may not include an 802.11 preamble and/or media access control header. In some aspects, the wake-up signal may identify (e.g. via a field set to an identifier of) the second device, as a device to which the wake-up signal is addressed. In some aspects, the wake-up signal may also identify a device transmitting the wake-up signal (e.g. via a field set to a station address of the device transmitting the wake-up signal).

In some aspects, the wake-up signal may not include a preamble. Alternatively, in some aspects, the wake-up signal may include a preamble having a first format, whereas other 802.11 packets, such as a data packet, utilize a different preamble format. For example, in some aspects, the wake-up signal may include a pseudo noise (PN) sequence to facilitate detection of a start of the wake-up signal. In some of these aspects, other 802.11 packets, such as data packets may utilize a more traditional preamble having one or more short training fields, long training fields, and signal fields. In some aspects, the wake-up signal may be transmitted using on-off keying (OOK) modulation. Other 802.11 packets, such as data packets may utilize a different modulation than the wake-up signal, such as BPSK, 16 QAM, 64 QAM, 256 QAM, or other modulations.

In block 1710, a receiver is transitioned from a low power state to an operable state in response to the wake-up signal. For example, in some aspects, block 1710 sends a signal from the low power receiver, which in some aspects received the wake-up signal in block 1705, to a "higher power" receiver and/or transceiver. For example, in some aspects, the low power receiver 625 may send a signal to the transceiver 610 of FIG. 6 in block 1710 in response to receiving the wake-up signal. The transceiver 620 may then transition from a low power state, where the transceiver may be inoperable, in that it is unable to send or receive data on a wireless network, to an operable state, where the transceiver 620 is able to send and receive data on the wireless network.

In block 1715 transmission of an acknowledgment of the wake-up signal is deferred by the second device based on a transmission from the first device. In some aspects, block 1715 may include performing a clear channel assessment. For example, block 1715 may determine an energy level on the wireless network. If the energy level is below a threshold, block 1715 may determine the channel is clear. Otherwise, block 1715 may determine the channel is busy. If the channel is busy, process 1700 may wait until the channel is not busy before transmitting on the channel. In block 1715, the second device may sense that the wireless network is busy due to a transmission by the first device on the wireless network. Thus, the second device (executing device) may defer the transmission. As discussed above, in some aspects, the first device may transmit during a period of time it is waiting for the second device to respond to the wake-up signal. This transmission by the first device during the waiting period may cause contention on the wireless network, such that the second device may defer a transmission of an acknowledgment of the wake-up signal based on the clear channel assessment.

In block 1720, the acknowledgment of the wake-up signal is encoded for transmission to the first device. In some aspects, block 1720 also includes transmitting the encoded acknowledgment to the first device. In some aspects, the acknowledgment is an 802.11 acknowledgment packet. In other aspects, the acknowledgment may be a QoS Null packet. The acknowledgment packet may be any packet in some aspects that is transmitted from the second device to the first device. The acknowledgment may be transmitted in response to a clear channel assessment process that determines the channel is clear. In some aspects, a back off procedure may be performed before the transmission of block 1720, with the back off procedure relying on the clear channel assessment process.

In some aspects, process 1700 includes encoding a message for transmission to the first device indicating a wake-up delay of the second station (e.g. via a field in the message set to a value of the wake-up delay). Some aspects of process 1700 also include transmitting the message to the first station. For example, in some aspects, a device may understand, via its inherent design, how much time it requires to transition its receiver/transceiver from the low power state (after receiving the wake-up signal) to the operable state. An indication of this time may be provided to the first device via a message transmitted by the second device to the first device. This value may assist the first device in determining a time out period for a wake-up signal transmitted by the first device to the second device.

Figure 17:
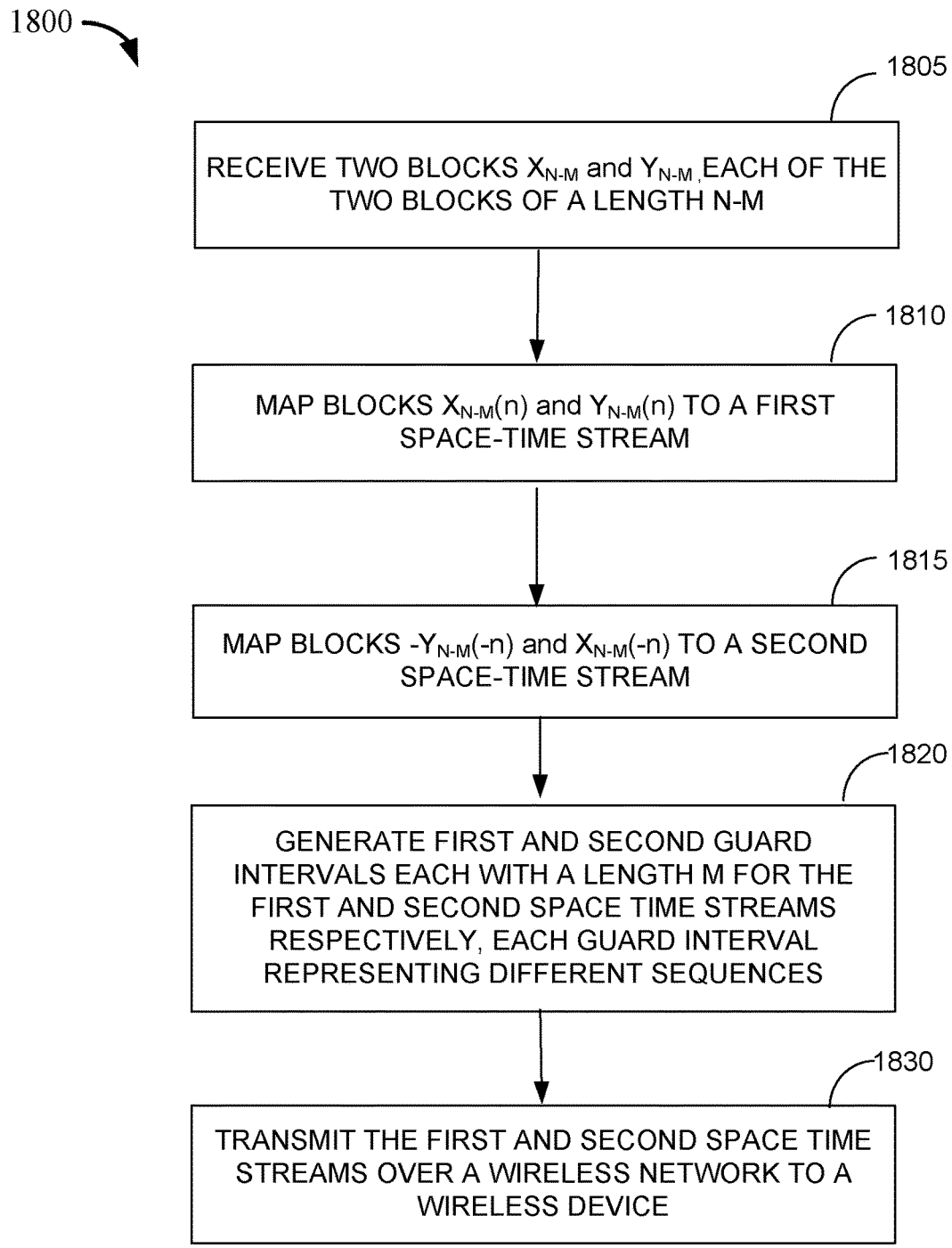
FIG. 17 is a flowchart of an exemplary method of space time block coding.

FIG. 17 is a flowchart of an exemplary method of space time block coding. The method of FIG. 17 may be performed in some aspects, by any of the devices illustrated in FIG. 5 for example. In some aspects, one or more of the functions discussed below with respect to FIG. 17 and process 1800 may be performed by the application processor 110, discussed above with respect to FIG. 1. For example, instructions stored in an electronic memory, which may be integrated with the application processor 110 or be a separate component, may configure the application processor 110 to perform one or more of the functions discussed below. In some aspects, the application processor 110 may comprise multiple physically separate hardware processors.

In some aspects, process 1800 discussed below with respect to FIG. 17 may apply coding to a data portion of a message and may utilize a similar single carrier symbol blocking structure as defined in the IEEE 802.11ad standard.

In block 1805, two blocks $X_{n-m}$ and $Y_{n-m}$ are received. Each of the two blocks has a length n-m. The units of length may be chips or samples.

In block 1810 blocks $X_{n-m}(n)$ and $Y_{n-m}(n)$ are mapped to a first space-time stream. In block 1815, a complex conjugation of blocks $-Y_{n-m}(-n)$ and $-X_{n-m}(-n)$ are mapped to a second space time stream. The "–n" notation represents reverse chips order in time.

In block 1820, first and second guard intervals are generated for the first and second space time stream respectively. Each of the guard intervals has a length m. Each of the generated guard intervals represents different sequences.

In block 1830, the first and second space time streams are transmitted over a wireless network to a wireless device.

Although the operations of some of the disclosed methods are described in a sequential order for convenient presentation, this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other embodiments may be used, such as by one of ordinary skill in the art upon reviewing the above description.

A first example implementation is a first station. The first station includes an electronic hardware memory and processing circuitry coupled to the memory. The processing circuitry is configured to encode a wake-up signal for transmission to a second station, determine a waiting period for the wake-up signal, wherein the first station is configured to decode an acknowledgment of the wake-up signal from the second station during the waiting period, and encode a packet for transmission to a third station during the waiting period.

In a second example implementation, the processing circuitry of the first station is further configured to refrain from exchanging data with the second station during the waiting period, and is further configured to exchange data with the second station in response to the acknowledgment.

In a third example implementation, the processing circuitry of the first station is further configured to determine whether to retransmit the wake-up signal to the second station based on at least one of: whether a number of timeout events for wake-up signals transmitted to the second station exceeds a maximum timeouts threshold, whether a number of wake-up signals transmitted to the second station exceeds a maximum wake-up signal threshold, or whether a maximum predetermined elapsed time since a first wake-up signal was transmitted to the second station is exceeded, and selectively retransmit the wakeup signal in accordance with the determination.

In a fourth example implementation of the first station, the wake-up signal is configured to cause the second station to transition out of a low-power state. In a fifth example implementation, the processing circuitry of the first station is further configured to decode an acknowledgment of the wake-up signal from the second station and communicate with the second station based on the acknowledgment. In a sixth example implementation, the processing circuitry of the first station is further configured to determine a first expiration time for the wake-up signal, and determine a second expiration time in response to another wake-up signal transmitted before the first expiration time to replace the first expiration time. In a seventh example implementation of the first station, the selective retransmission retransmits the wake-up signal, and the processing circuitry of the first station is further configured to perform a back-off procedure in response to a determination to retransmit the wake-up signal, wherein the retransmission of the wake-up signal is in response to a completion of the back-off procedure. In an eighth example implementation of the first station, the processing circuitry is further configured to perform a second back-off procedure, wherein the transmission of the wake-up signal is performed in response to a completion of the second back-off procedure. In a ninth example implementation, the processing circuitry of the first station is further configured to decode a message from the second station indicating a wake-up delay for the second station, and to determine a timeout event occurred after transmission of the wake-up signal to the second station based on the indicated wake-up delay. In a tenth example implementation of the first station, the first station also includes transceiver circuitry coupled to the processing circuitry. In an eleventh implementation, the first station includes one or more antennas coupled to the transceiver circuitry. In a twelfth example implementation, the processing circuitry of the first station is further configured to transmit a plurality of wake-up signals to the second station including the first wake-up signal, the first wake-up signal transmitted before the other wake-up signals of the plurality of wake-up signals, determine an elapsed time since the transmission of the first wake-up signal, and determine whether the elapsed time is less than the maximum predetermined elapsed time since the first wake-up signal. The wake-up signal is retransmitted in response to the elapsed time being less than the maximum predetermined elapsed time. In a thirteenth example implementation, the processing circuitry is further configured to perform a plurality of transmissions of the wake-up signal to the second device including a first transmission of the wake-up signal, the first transmission before the other transmissions of the plurality of transmissions, determine a timeout event for any of the plurality of transmissions to the second station based on an elapsed time since the transmission exceeding a threshold, and determine a number of determined timeout events for transmissions of wake-up signals for the second station, wherein the wake-up signal is retransmitted in response to the determined number of timeout events being below the maximum timeouts threshold.

In a fourteenth example implementation, the processing circuitry of the first station is further configured to perform a plurality of transmissions of the wake-up signal to the second station including a first transmission of the wake-up signal, the first transmission before the other transmissions of the plurality of transmissions, and determine a number of wake-up signals transmitted to the second station, wherein the wake-up signal is retransmitted in response to the determined number of wake-up signals transmitted being below the maximum wake-up signals threshold.

A fifteenth example implementation is a method of transmitting a wake-up signal by a first station to a second station. The method includes encoding, by the first station, a wake-up signal for transmission to a second station, determining a waiting period for the wake-up signal, decoding, by the first station, an acknowledgment of the wake-up signal from the second station during the waiting period, and encoding a packet for transmission to a third station during the waiting period.

A sixteenth example implementation of the method also includes refraining from exchanging data with the second station during the waiting period, and exchanging data with the second station in response to the acknowledgment. A seventieth example implementation of the method also includes determining, by the first station, whether to retransmit the wake-up signal to the second station based on at least one of: whether a number of timeout events for wake-up signals transmitted to the second station exceeds a maximum timeouts threshold, whether a number of wake-up signals transmitted to the second station exceeds a maximum wake-up signals threshold, or whether a maximum predetermined elapsed time since a first wake-up signal was transmitted to the second station is exceeded, and selectively retransmitting the wakeup signal in accordance with the determination.

An eighteenth example implementation is a first station for transmitting a wake-up signal to a second station. The first station includes means for encoding a wake-up signal for transmission to a second station. means for determining a waiting period for the wake-up signal, means for decoding an acknowledgment of the wake-up signal from the second station during the waiting period, and means for encoding a packet for transmission to a third station during the waiting period. In a nineteenth example implementation, the wake up signal is configured to cause the second station to transitory out of a low power state. In a twentieth example implementation, the first station also includes means for decoding an acknowledgment of the wake-up signal from the second station, and means for communication with the second station based on the acknowledgment.

A twenty first example implementation also includes means for refraining from exchanging data with the second station during the waiting period, and means for exchanging data with the second station in response to the acknowledgment. A twenty second example implementation of the first station also includes means for determining whether to retransmit the wake-up signal to the second station based on at least one of: whether a number of timeout events for wake-up signals transmitted to the second station exceeds a maximum timeouts threshold, whether a number of wake-up signals transmitted to the second station exceeds a maximum wake-up signals threshold, or whether a maximum predetermined elapsed time since a first wake-up signal was transmitted to the second station is exceeded; and means for selectively retransmitting the wakeup signal in accordance with the determination.

A twenty third example implementation of the first station also includes means for determining a first expiration time for the wake-up signal and means for determining a second expiration time in response to another wake-up signal transmitted before the first expiration time to replace the first expiration time. In a twenty fourth example implementation, the selective retransmission retransmits the wake-up signal, and the first station further includes means for performing a back-off procedure in response to a determination to retransmit the wake-up signal, wherein the retransmission of the wake-up signal is in response to a completion of the back-off procedure. In a twenty fifth example implementation, the first station also includes means for performing a second back-off procedure, wherein the transmission of the wake-up signal is performed in response to a completion of the second back-off procedure. In a twenty sixth example implementation, the first station also includes means for decoding a message from the second station indicating a wake-up delay for the second station, and means for determining a timeout event occurred after transmission of the wake-up signal to the second station based on the indicated wake-up delay. In a twenty seventh example implementation, the first station includes means for receiving and means for transmitting. In a twenty eighth example implementation, the first station includes one or more antennas coupled to the means for receiving and means for transmitting. In a twenty ninth example implementation, the first station also includes means for transmitting a plurality of wake-up signals to the second station including the first wake-up signal, the first wake-up signal transmitted before the other wake-up signals of the plurality of wake-up signals, means for determining an elapsed time since the transmission of the first wake-up signal; and means for determining whether the elapsed time is less than the maximum predetermined elapsed time since the first wake-up signal, wherein the wake-up signal is retransmitted in response to the elapsed time being less than the maximum predetermined elapsed time.

In a thirtieth example implementation, the first station includes means for performing a plurality of transmissions of the wake-up signal to the second device including a first transmission of the wake-up signal, the first transmission before the other transmissions of the plurality of transmissions, means for determining a timeout event for any of the plurality of transmissions to the second station based on an elapsed time since the transmission exceeding a threshold, and means for determining a number of determined timeout events for transmissions of wake-up signals for the second station, wherein the wake-up signal is retransmitted in response to the determined number of timeout events being below the maximum timeouts threshold.

In a thirty first example implementation, the first station also includes means for performing a plurality of transmissions of the wake-up signal to the second station including a first transmission of the wake-up signal, the first transmission before the other transmissions of the plurality of transmissions, and means for determining a number of wake-up signals transmitted to the second station, wherein the wake-up signal is retransmitted in response to the determined number of wake-up signals transmitted being below the maximum wake-up signals threshold.

A thirty second example implementation is a non-transitory computer readable storage medium comprising instructions that when executed cause one or more hardware processors to configure a first station to encode a wake-up signal for transmission to a second station, determine a waiting period for the wake-up signal, wherein the first station is configured to decode an acknowledgment of the wake-up signal from the second station during the waiting period and encode a packet for transmission to a third station during the waiting period. A thirty third example implementation, the non-transitory computer readable medium includes additional instructions that configure the one or more hardware processors to determine, by the first station, whether to retransmit the wake-up signal to the second station based on at least one of whether a number of timeout events for wake-up signals transmitted to the second station exceeds a maximum timeouts threshold, whether a number of wake-up signals transmitted to the second station exceeds a maximum wake-up signals threshold, or whether a maximum predetermined elapsed time since a first wake-up signal was transmitted to the second station is exceeded, and selectively retransmit the wakeup signal in accordance with the determination.

A thirty fourth example implementation is a first station including an electronic memory and processing circuitry coupled to the memory, the processing circuitry configured to receive, by a low power receiver of the first station, a wake-up signal from a second station, transition a second receiver of the first station from a low power state to an operable state in response to the wake-up signal, defer transmission of an acknowledgment of the wake-up signal to the second station based on receipt of a transmission from the first station; and encode the acknowledgment of the wake-up signal for transmission to the second station in response to a completion of the reception of the transmission from the first station. A thirty fifth example implementation includes processing circuitry configured to perform a clear channel assessment in response to transitioning from the low power state to the operable state, and encode the acknowledgment to the wake-up signal for transmission in response to the clear channel assessment determining the channel is clear. A thirty sixth example implementation includes processing circuitry configured to generate a message indicating a wake-up delay to transition the receiver of the first station from the low power state to the operable state; and transmit the message to the second station.

A thirty seventh example implementation is a first station. The first station includes means for receive a wake-up signal from a second station, means for transitioning a second means for receiving from a low power state to an operable state in response to the wake-up signal, means for deferring transmission of an acknowledgment of the wake-up signal to the second station based on receipt of a transmission from the second station; and means for encoding the acknowledgment of the wake-up signal for transmission to the second station in response to a completion of the reception of the transmission from the second station. A thirty eighth example implementation also includes means for performing a clear channel assessment in response to transitioning from the low power state to the operable state, and means for encoding the acknowledgment to the wake-up signal for transmission in response to the clear channel assessment determining the channel is clear. A thirty ninth example implementation of the first station includes means for generating a message indicating a wake-up delay to transition the receiver of the first station from the low power state to the operable state, and means for transmitting the message to the second station.

The Abstract is provided to allow the reader to ascertain the nature and gist of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in an example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of an access point (AP) configured for wake-up radio (WUR) operations, the apparatus comprising:
    processing circuitry; and
    memory,
    the processing circuitry configured to:
    decode a frame received from a non-AP station (STA), the frame indicating that the non-AP station is a WUR STA, the frame further indicating a transition delay, the transition delay indicating a time that the non-AP STA takes to transition from a low-power state to an operable state;
    initiate a backoff procedure to contend for a wireless medium for transmission of a wake-up packet, the wake-up packet for transmission to a WUR of the non-AP STA;
    after transmission of the wake-up packet, wait a timeout interval for a transmission from the non-AP STA, the timeout interval being larger than the transition delay;
    initiate a backoff procedure for retransmission of the wake-up packet to the WUR of the non-AP STA when any transmission from the non-AP STA is not received within the timeout interval;
    transmit a data packet to the non-AP STA when an acknowledgement from the non-AP STA is received within the timeout interval; and
    refrain from transmitting the data packet to the non-AP STA when the acknowledgement from the non-AP STA is not received within the timeout interval.

2. The apparatus of claim 1, wherein the processing circuitry is configured to cause the AP to transmit the wake-up packet to a WUR of the non-AP STA at a pre-scheduled time.

3. The apparatus of claim 1, wherein the wake-up packet comprises a plurality of wake-up frames, each wake-up frame for receipt by a non-AP STA indicated to be a WUR STA.

4. The apparatus of claim 3, wherein the wake-up frames of the plurality are configured by the processing circuitry for frequency division multiple access (FDMA) transmission.

5. The apparatus of claim 3, wherein each of the wake-up frames are configured by the processing circuitry for FDMA transmission on different frequency channels comprising one or more 20 MHz channels, a 40 MHz channel and an 80 MHz channel.

6. The apparatus of claim 1 wherein after transmission of the wake-up packet, the processing circuitry is configured to wait the timeout interval for an acknowledgement from the non-AP STA, initiate a backoff procedure for retransmission of the wake-up packet to the WUR of the non-AP STA when an acknowledgement from the non-AP STA is not received within the timeout interval, and transmit the data packet to the non-AP STA when the acknowledgement from the non-AP STA is received within the timeout interval.

7. The apparatus of claim 6 wherein the acknowledgement indicates an acknowledgement of receipt of the wake-up packet by the non-AP STA.

8. The apparatus of claim 1 wherein after transmission of the wake-up packet, the processing circuitry is configured to wait the timeout interval for a non-acknowledgement transmission from the non-AP STA, initiate a backoff procedure for retransmission of the wake-up packet to the WUR of the non-AP STA when the non-acknowledgement transmission from the non-AP STA is not received within the timeout interval, and transmit the data packet to the non-AP STA when the non-acknowledgement transmission from the non-AP STA is received within the timeout interval.

9. The apparatus of claim 1 wherein the memory is configured to store a value associated with the transition delay.

10. An apparatus of an access point (AP) configured for wake-up radio (WUR) operations, the apparatus comprising:
processing circuitry; and
memory,
the processing circuitry configured to:
decode a frame received from a non-AP station (STA), the frame indicating that the non-AP station is a WUR STA and comprising a transition delay, the transition delay indicating a time that the non-AP STA takes to transition from a low-power state to an operable state;
initiate a backoff procedure to contend for a wireless medium for transmission of a wake-up packet, the wake-up packet for transmission to a WUR of the non-AP STA;
after transmission of the wake-up packet, wait a timeout interval for a transmission from the non-AP STA, the timeout interval being larger than the transition delay;
initiate a backoff procedure for retransmission of the wake-up packet to the WUR of the non-AP STA when any transmission from the non-AP STA is not received within the timeout interval; and
transmit a data packet to the non-AP STA when an acknowledgement from the non-AP STA is received within the timeout interval,
wherein during the transition delay, the processing circuitry is configured to encode a transmission of a packet to a second non-AP STA.

11. An apparatus of an access point (AP) configured for wake-up radio (WUR) operations, the apparatus comprising:
processing circuitry; and
memory,
the processing circuitry configured to;
decode a frame received from a non-AP station (STA), the frame indicating that the non-AP station is a WUR STA and comprising a transition delay, the transition delay indicating a time that the non-AP STA takes to transition from a low-power state to an operable state;
initiate a backoff procedure to contend for a wireless medium for transmission of a wake-up packet, the wake-up packet for transmission to a WUR of the non-AP STA;
after transmission of the wake-up packet, wait a timeout interval for a transmission from the non-AP STA, the timeout interval being larger than the transition delay;
initiate a backoff procedure for retransmission of the wake-up packet to the WUR of the non-AP STA when any transmission from the non-AP STA is not received within the timeout interval; and
transmit a data packet to the non-AP STA when an acknowledgement from the non-AP STA is received within the timeout interval,
wherein the apparatus further comprises a direct conversion mixer, the direct conversion mixer configured to directly downconvert RF signals to baseband signals, and
wherein the processing circuitry is configured to decode the baseband signals.

12. An apparatus of an access point (AP) configured for wake-up radio (WUR) operations, the apparatus comprising:
processing circuitry; and
memory,
the processing circuitry configured to:
decode a frame received from a non-AP station (STA), the frame indicating that the non-AP station is a WUR STA and comprising a transition delay, the transition delay indicating a time that the non-AP STA takes to transition from a low-power state to an operable state;
initiate a backoff procedure to contend for a wireless medium for transmission of a wake-up packet, the wake-up packet for transmission to a WUR of the non-AP STA;
after transmission of the wake-up packet wait a timeout interval for a transmission from the non-AP STA, the timeout interval being larger than the transition delay;
initiate a backoff procedure for retransmission of the wake-up packet to the WUR of the non-AP STA when any transmission from the non-AP STA is not received within the timeout interval; and
transmit a data packet to the non-AP STA when an acknowledgement from the non-AP STA is received within the timeout interval,
further comprising wherein the apparatus further comprises a super-heterodyne mixer, the super-heterodyne mixer configured to downconvert RF signals to intermediate frequency signals prior to generation of baseband signals, and
wherein the processing circuitry is configured to decode the baseband signals.

13. A non-transitory computer-readable storage medium that stores instructions for execution by processing circuitry of an access point (AP) to configure the AP for wake-up radio (WUR) operations, the instructions to configure the processing circuitry to:
decode a frame received from a non-AP station (STA), the frame indicating that the non-AP station is a WUR STA, the frame further indicating a transition delay, the transition delay indicating a time that the non-AP STA takes to transition from a low-power state to an operable state;

initiate a backoff procedure to contend for a wireless medium for transmission of a wake-up packet, the wake-up packet for transmission to a WUR of the non-AP STA;

after transmission of the wake-up packet, wait a timeout interval for a transmission from the non-AP STA, the timeout interval being larger than the transition delay;

initiate a backoff procedure for retransmission of the wake-up packet to the WUR of the non-AP STA when any transmission from the non-AP STA is not received within the timeout interval;

transmit a data packet to the non-AP STA when an acknowledgement from the non-AP STA is received within the timeout interval; and refrain from transmitting the data packet to the non-AP STA when the acknowledgement from the non-AP STA is not received within the timeout interval.

14. The non-transitory computer-readable storage medium of claim 13, wherein the processing circuitry is configured to cause the AP to transmit the wake-up packet to a WUR of the non-AP STA at a pre-scheduled time.

15. The non-transitory computer-readable storage medium of claim 13, wherein the wake-up packet comprises a plurality of wake-up frames, each wake-up frame for receipt by a non-AP STA indicated to be a WUR STA.

16. The non-transitory computer-readable storage medium of claim 15, wherein the wake-up frames of the plurality are configured by the processing circuitry for frequency division multiple access (FDMA) transmission.

17. The non-transitory computer-readable storage medium of claim 15, wherein each of the wake-up frames are configured by the processing circuitry for FDMA transmission on different frequency channels comprising one or more 20 MHz channels, a 40 MHz channel and an 80 MHz channel.

18. The non-transitory computer-readable storage medium of claim 13, wherein during the transition delay, the processing circuitry is configured to encode a transmission of a packet to a second non-AP STA.

19. The non-transitory computer-readable storage medium of claim 13 wherein after transmission of the wake-up packet, the processing circuitry is configured to wait the timeout interval for an acknowledgement from the non-AP STA, initiate a backoff procedure for retransmission of the wake-up packet to the WUR of the non-AP STA when an acknowledgement from the non-AP STA is not received within the timeout interval, and transmit the data packet to the non-AP STA when the acknowledgement from the non-AP STA is received within the timeout interval.

20. The non-transitory computer-readable storage medium of claim 19 wherein the acknowledgement indicates an acknowledgement of receipt of the wake-up packet by the non-AP STA.

* * * * *

UNITED STATES PATENT AND TRADEMARK OFFICE
CERTIFICATE OF CORRECTION

PATENT NO. : 11,109,318 B2  
APPLICATION NO. : 16/570905  
DATED : August 31, 2021  
INVENTOR(S) : Huang et al.

Page 1 of 1

It is certified that error appears in the above-identified patent and that said Letters Patent is hereby corrected as shown below:

In the Claims

In Column 30, Line 2, in Claim 11, delete "to;" and insert --to:-- therefor

In Column 30, Line 43, in Claim 12, delete "packet" and insert --packet,-- therefor Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*